United States Patent
Chen et al.

(10) Patent No.: US 10,791,578 B2
(45) Date of Patent: Sep. 29, 2020

(54) USER EQUIPMENT AND BASE STATION FOR MOBILE COMMUNICATION SYSTEM HAVING A LINKAGE BETWEEN UPLINK BWPS AND DOWNLINK BWPS

(71) Applicant: Institute For Information Industry, Taipei (TW)

(72) Inventors: Chiu-Wen Chen, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/191,425

(22) Filed: Nov. 14, 2018

(65) Prior Publication Data
US 2019/0150200 A1    May 16, 2019

Related U.S. Application Data

(60) Provisional application No. 62/586,910, filed on Nov. 16, 2017.

(51) Int. Cl.
| | |
|---|---|
| H04W 74/08 | (2009.01) |
| H04W 88/08 | (2009.01) |
| H04W 88/02 | (2009.01) |
| H04W 72/04 | (2009.01) |
| H04W 74/00 | (2009.01) |

(52) U.S. Cl.
CPC ...... H04W 74/0833 (2013.01); H04W 72/042 (2013.01); H04W 74/006 (2013.01); H04W 88/02 (2013.01); H04W 88/08 (2013.01)

(58) Field of Classification Search
CPC ........... H04W 74/0833; H04W 74/006; H04W 88/08; H04W 88/02; H04W 72/042
See application file for complete search history.

(56) References Cited

U.S. PATENT DOCUMENTS

| | | |
|---|---|---|
| 2009/0196262 A1 | 8/2009 | Chin et al. |
| 2011/0064042 A1 | 3/2011 | Kim et al. |
| 2016/0127991 A1 | 5/2016 | Ang et al. |
| 2019/0044689 A1* | 2/2019 | Yiu ........................ H04L 5/0098 |
| 2019/0059112 A1* | 2/2019 | Ou ........................ H04W 74/008 |
| 2019/0132857 A1* | 5/2019 | Babaei .............. H04W 72/0453 |
| 2019/0141742 A1* | 5/2019 | Zhou ........................ H04B 7/02 |
| 2019/0364602 A1* | 11/2019 | Yi ...................... H04W 74/0833 |

FOREIGN PATENT DOCUMENTS

TW     201616895 A     5/2016

OTHER PUBLICATIONS

Office Action to the corresponding Taiwan Patent Application No. 107139865 rendered by the Taiwan Intellectual Property Office (TIPO) dated May 10, 2019, 13 pages (including English translation).

* cited by examiner

*Primary Examiner* — Walli Z Butt
(74) *Attorney, Agent, or Firm* — Skaar Ulbrich Macari, P.A.

(57) ABSTRACT

A user equipment (UE) and a base station (BS) for a mobile communication system are provided. The UE transmits a preamble to the BS on a physical random access channel of an active uplink bandwidth part of a plurality of uplink bandwidth parts and receives a random access response message from the BS on an active downlink bandwidth part of a plurality of downlink bandwidth parts according to a linkage. The linkage defines that the active downlink bandwidth part corresponds to the active uplink bandwidth part.

18 Claims, 27 Drawing Sheets

USER EQUIPMENT AND BASE STATION
FOR MOBILE COMMUNICATION SYSTEM
HAVING A LINKAGE BETWEEN UPLINK
BWPS AND DOWNLINK BWPS

PRIORITY

This application claims priority to U.S. Provisional Patent Application No. 62/586,910 filed on Nov. 16, 2017, which is hereby incorporated herein by reference in its entirety.

FIELD

The present invention relates to a user equipment (UE) and a base station (BS) for a mobile communication system. Specifically, according a linkage, the UE may transmit a preamble to the BS on a physical random access channel of an active uplink bandwidth part (BWP) and receive a random access response message from the BS on an active downlink BWP corresponding to the active uplink BWP without switching back to an initial downlink BWP.

BACKGROUND

With the development of the technology, various electronic products are ubiquitous in people's daily life, and people's needs for wireless communication are increasing. To achieve various application in life, the next generation mobile communication system (which is commonly called the 5G mobile communication system currently) has the wider bandwidth (e.g., up to 1-2 GHz) than the 4G mobile communication system.

As shown in FIG. 1, the bandwidth BW of the 5G mobile communication system may be divided into a plurality of component carriers CC1-CCn. However, it is still not practical for the UE to perform signal transmission on the bandwidth of the whole component carrier (e.g., 400 MHz) since the UE may be required to have a higher bandwidth capability and the power consumption of the UE may increase consequently so as to increase the manufacturing cost. In order to reduce the manufacturing cost of the UE, each component carrier may be further divided into multiple bandwidth parts (BWPs), as the BWPs BWP1-BWP4 in FIG. 1

In such a situation, according to the current release of the 5G mobile communication system standard, for each UE, the BS can configure an initial uplink BWP and other BWPs for uplink transmission and configure an initial downlink BWP and other downlink BWPs for downlink transmission. Moreover, for each UE, the BS may instruct the UE to switch to one of the other uplink BWPs as its active uplink BWP. Similarly, the BS may instruct the UE switch to one of the other downlink BWPs as its active downlink BWP. However, there is no correspondence between the other uplink BWPs and the other downlink BWPs, so when a UE performs the random access procedure to transmit a preamble to the BS for requesting information or services (e.g., on-demand system information (SI)), the BS has to transmit the random access response message on every downlink BWP to make sure the UE can receive the random access response message. This would cause the loading of BS in signal transmission to be increased.

On the other hand, to avoid the BS to transmit the random access response message on every downlink BWP, the UE would only switch back to the initial uplink BWP to transmit the preamble on the initial uplink BWP, and the BS would only transmit the random access response message to the UE on the initial downlink BWP. In other words, if the uplink signal transmitted by the UE is not located on the specific radio resource of the active uplink bandwidth part and does not carry the UE's identifier, the BS is unable to recognize the UE and transmit the random access response message to the UE on the active downlink BWP that the UE is staying on.

Besides, when the number of UEs served by the BS increases, all of the UEs may need to switch back to the initial uplink BWP and the initial downlink BWP due to the above situation. This will cause higher resource loading on the initial uplink and downlink BWPs and cause the signal transmission collision to happen more easily so as to make the radio resources unable to be well utilized.

Accordingly, an urgent need exists in the art to provide a BWP configuration mechanism so that the UE can transmit preamble and receive random access response message without switching back to the initial uplink and downlink BWPs.

SUMMARY

An objective is to provide a BWP configuration mechanism which enables a user equipment (UE) to transmit a preamble on its active uplink BWP and to receive a random access response message transmitted by a base station on an active downlink BWP corresponding to the active uplink BWP based on a linkage between the uplink BWPs and the downlink BWPs to reduce the possibilities that the UEs switch back to the initial uplink and downlink BWPs and further decreases the signal transmission collisions on the initial uplink BWP. Therefore, the BWP configuration mechanism can balance the resource utilization among the BWPs and can further reduce the UE's transmission latency.

Provided is a user equipment (UE) for a mobile communication system. The UE comprises a storage, a transceiver and a processor. The processor is electrically connected to the storage and the transceiver, and is configured to execute the following operations: transmitting, via the transceiver, a preamble to a base station (BS) on a physical random access channel (PRACH) of an active uplink BWP of a plurality of uplink BWPs; and receiving, via the transceiver, a random access response message from the BS on an active downlink BWP of a plurality of downlink BWPs according to a linkage. The linkage defines that the active downlink BWP corresponds to the active uplink BWP.

Also provided is a BS for a mobile communication system. The BS comprises a storage, a transceiver and a processor. The processor is electrically connected to the storage and the transceiver, and is configured to execute the following operations: receiving, via the transceiver, a preamble on a PRACH of one of a plurality of uplink BWPs; and transmitting, via the transceiver, a random access response message on one of a plurality of downlink BWPs according to a linkage. The linkage defines that the one of the downlink BWPs corresponds to the one of uplink BWPs.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular example, embodiment, environment, applications or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
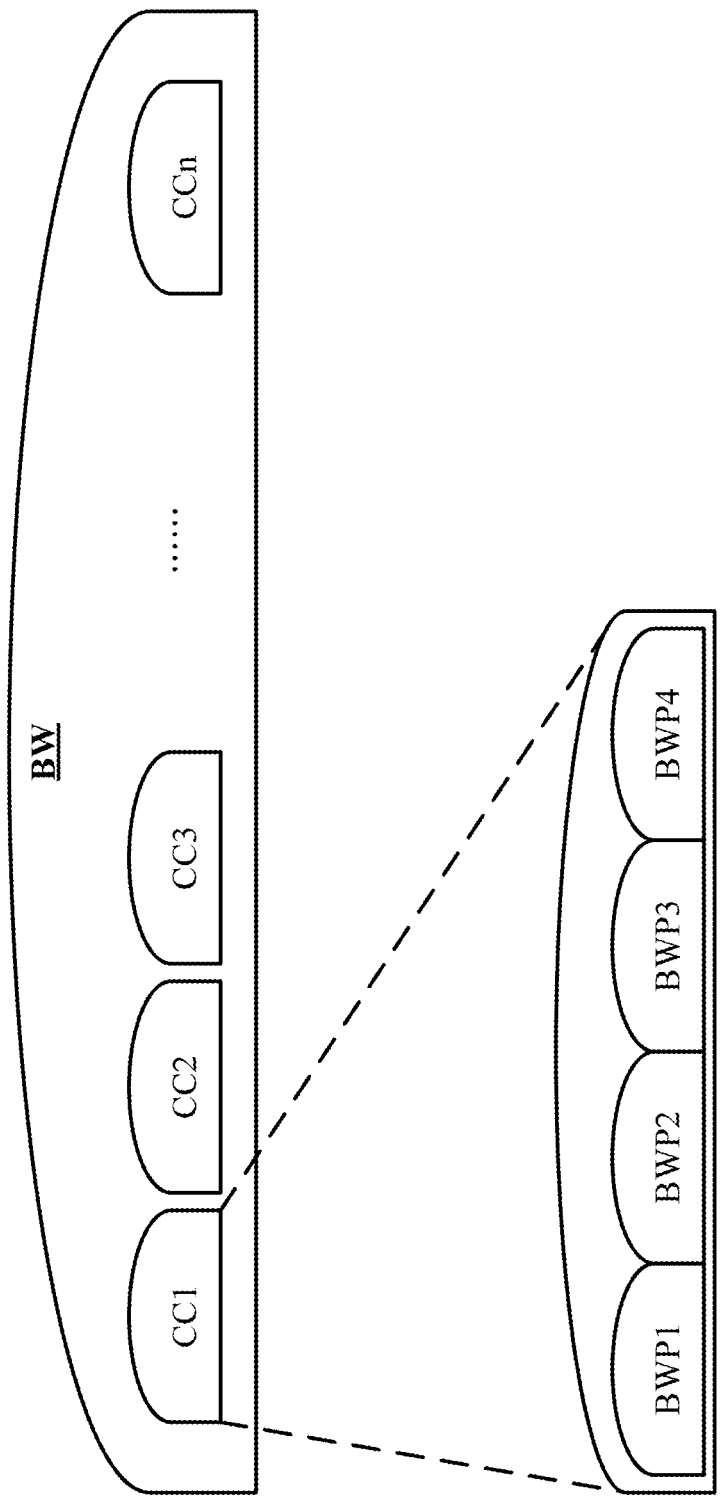
FIG. 1 depicts a bandwidth schema of the 5G mobile communication system.
Figure 2:
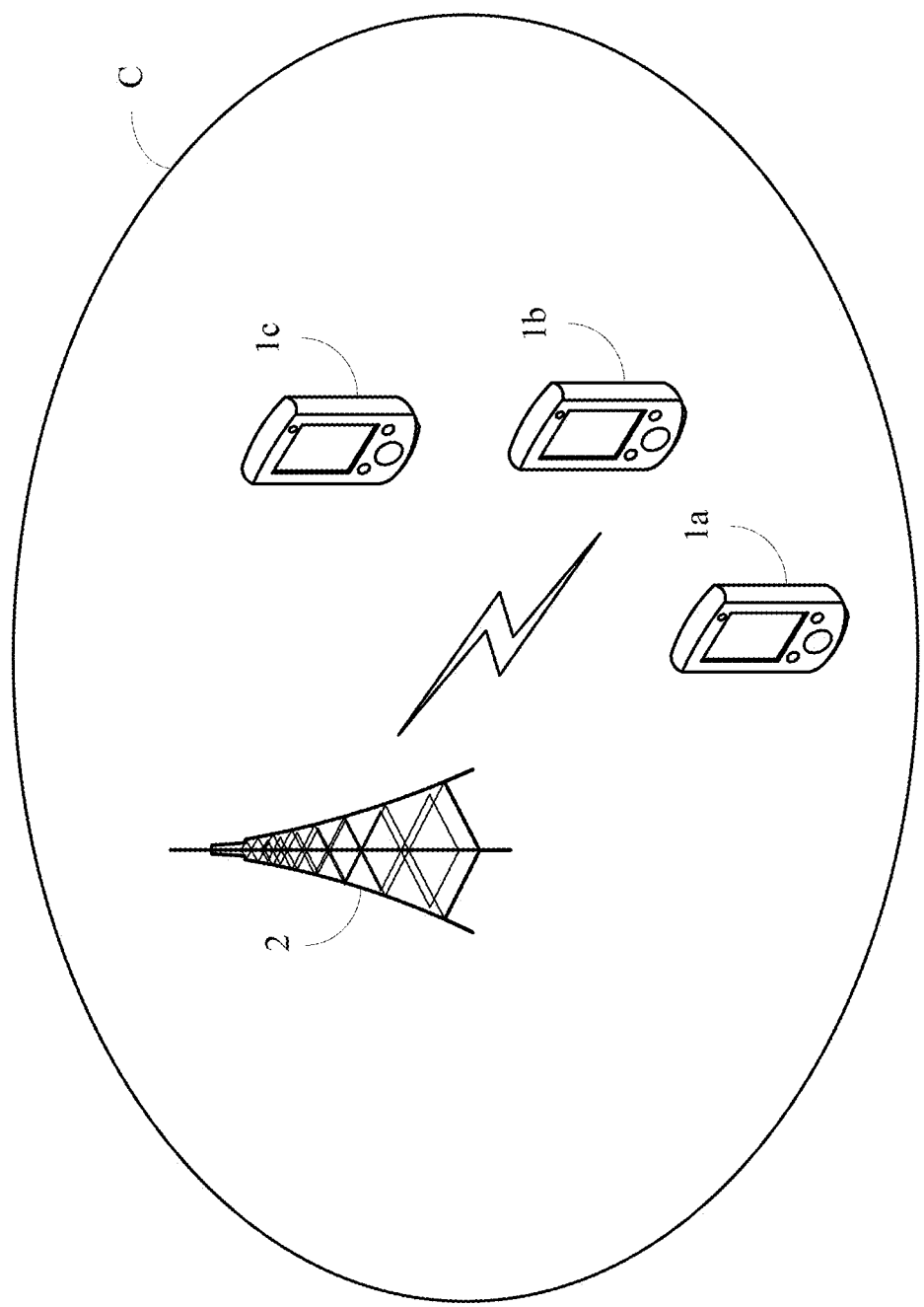
FIG. 2 depicts an implementation scenario of a mobile communication system according to the present invention.
Figure 3:
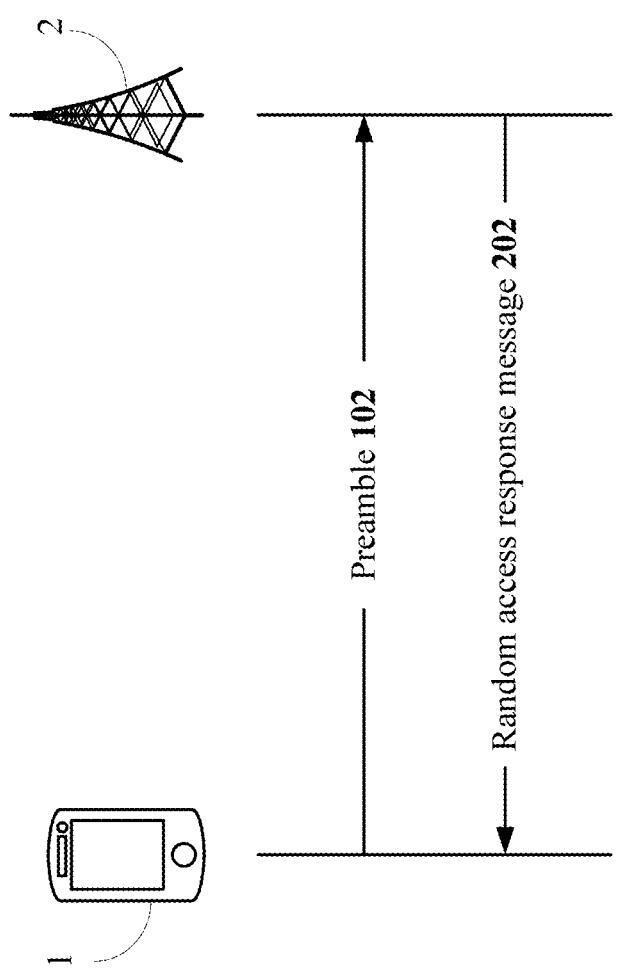
FIG. 3 depicts an implementation scenario of signal transmission between the UE 1 and the BS 2 according to the present invention.

A first embodiment of the present invention is as shown in FIGS. 2 to 5. FIG. 2 depicts an implementation scenario of a mobile communication system according to the present invention. FIG. 3 depicts an implementation scenario of signal transmission between the user equipment (UE) 1 and the base station (BS) 2 according to the present invention. It shall be appreciated that, the UE 1 in FIG. 3 may be any of UEs 1a, 1b and 1c, and for simplification of the description, signal transmission between a single UE 1 and the BS 2 is taken as an example in FIG. 3 for illustration. The signal transmission between the BS 2 and multiple UEs shall be appreciated by those of ordinary skill in the art based on the following description and thus will be not further described herein.

As shown in FIG. 2, the BS 2 in the mobile communication system has a signal coverage C, and the UEs 1a, 1b and 1c are all within the signal coverage C. To simplify the description, only three UEs 1a, 1b and 1c are depicted in FIG. 2. However, the number of UEs within the signal coverage C of the BS 2 is not intended to limit the scope of the present invention. The mobile communication system may be the next generation of mobile communication system (broadly called the 5G mobile communication system currently) or any mobile communication systems based on the orthogonal frequency division multiple access (OFDMA) technology. Each of the UEs 1a, 1b and 1c may be a smart phone, a tablet computer or any wireless communication device, e.g., a UE supporting an ultra-reliable low latency communication (URLLC) service (also called the URLLC UE), a UE supporting an enhanced mobile broadband (eMBB) service (also called the eMBB UE) or a massive machine type communication (mMTC) service (also called the mMTC UE), but not limited thereto.

Figure 4A:
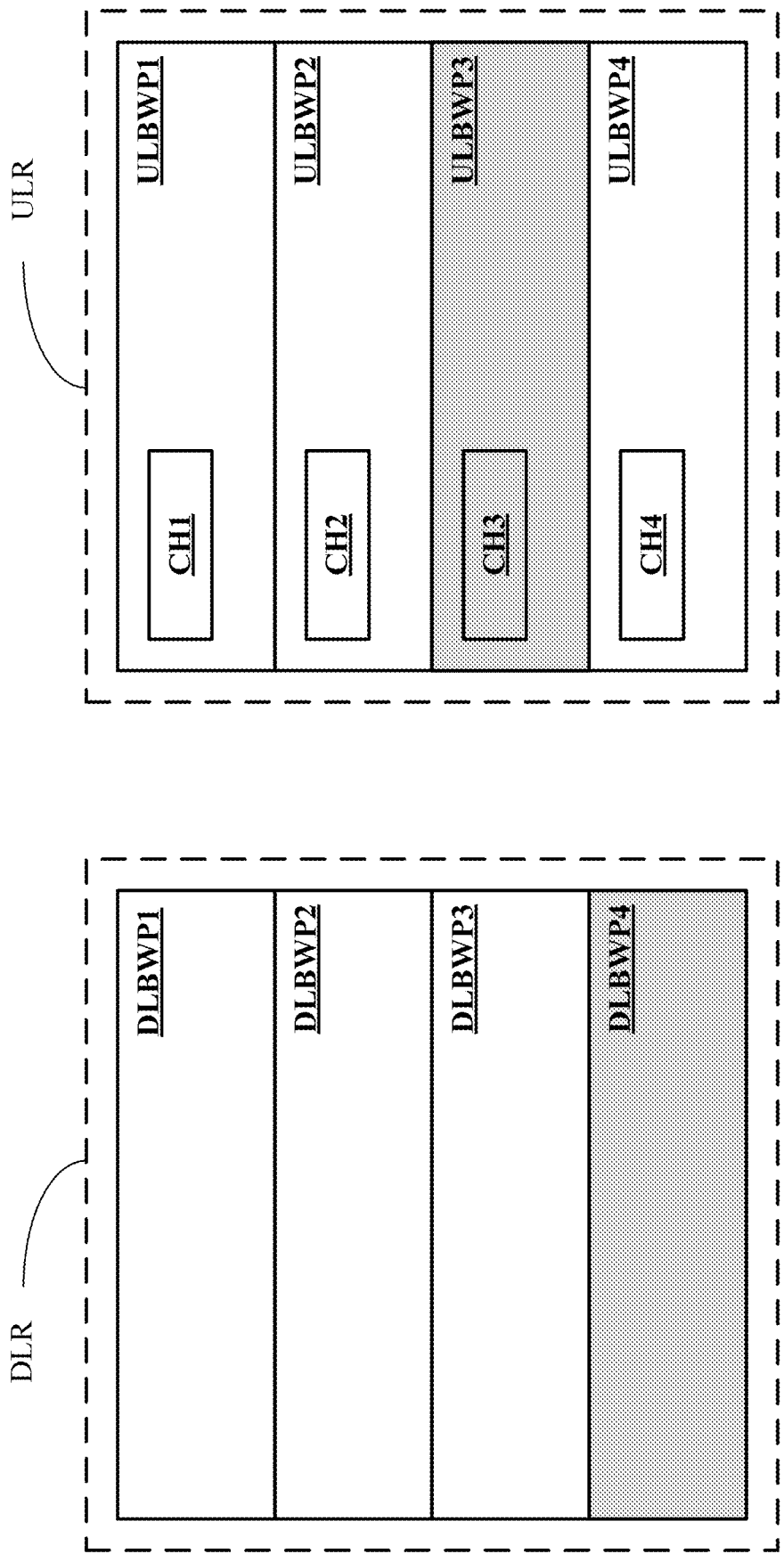
FIGS. 4A-4B depict an implementation scenario in which the UE 1 switches the downlink BWP according to the linkage.
Figure 4B:
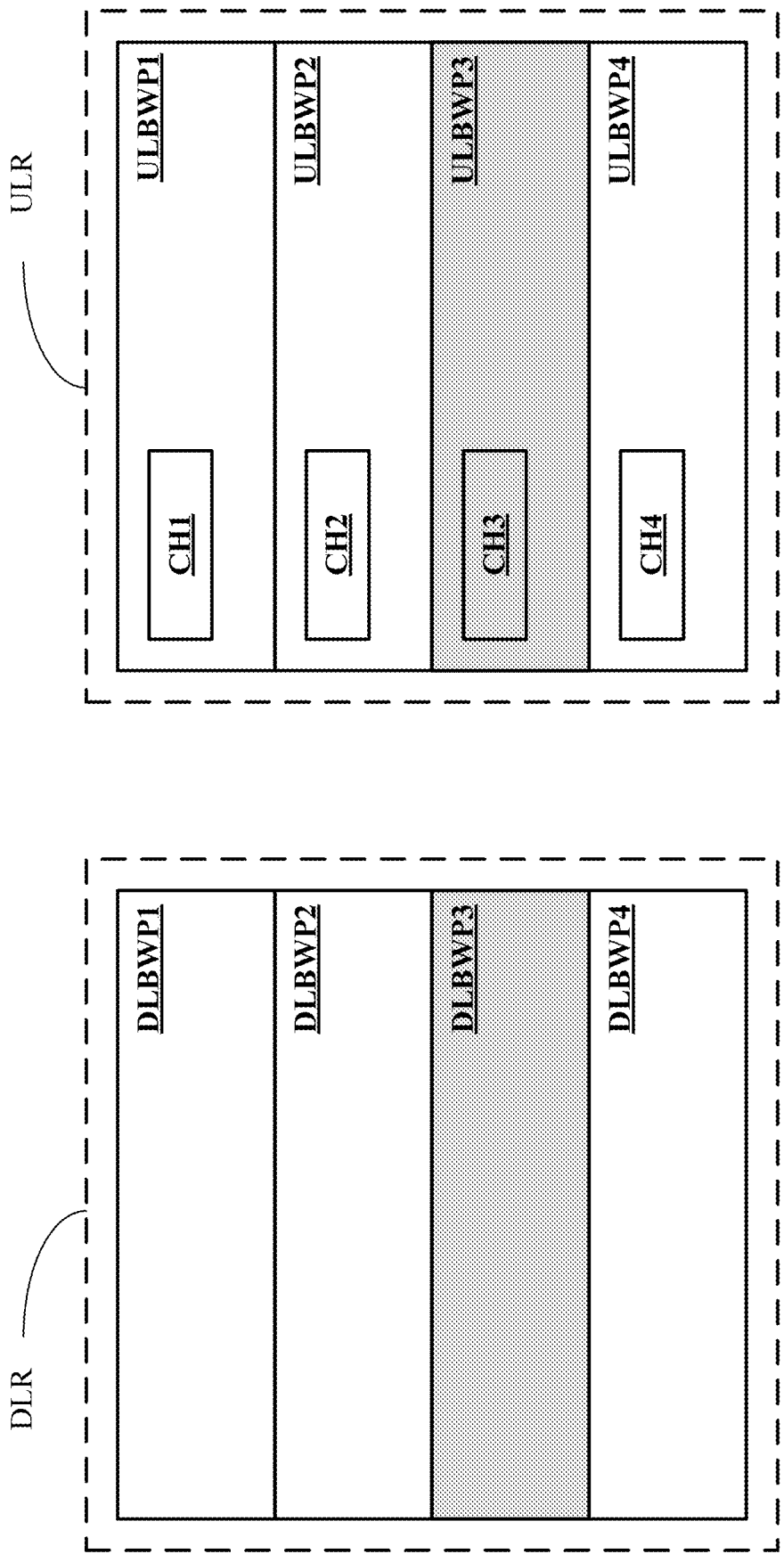

Please refer to FIG. 3 and FIGS. 4A-4B, in which the BWPs could be separated into the uplink area ULR and the downlink area DLR, and the gray portion represents the uplink and downlink BWPs that the UE 1 stays on. In this embodiment, the BS 2 configures the PRACHs on all uplink BWPs configured to the UE 1, and configures all downlink BWPs to have the common search space for receiving random access response message.

It shall be appreciated that, in this embodiment, the BS 2 only configures the common search space for receiving the random access response message and the UE-specific search space on the other downlink BWPs which are not the initial or default BWP. In other words, except for the common search space for receiving the random access response message, the BS 2 does not configure other common search spaces on the other downlink BWPs. Therefore, according to the following embodiments of the present invention, if the UE 1 needs to receive the on-demand system information (SI), the other SI, the updated SI or the paging message, the BS 2 will instruct the UE 1 to switch from its active BWP to the initial BWP or the default BWP through a message-based method or a timer-based method.

When the UE 1 would like to request the on-demand SI from the BS 2, the UE 1 transmits the preamble 102 on the PRACH CH3 of the active uplink BWP ULBWP3 in the uplink area ULR. However, as shown in FIG. 4A, the UE 1 could not receive the random access response message 202 transmitted by the BS 2 from the active downlink BWP ULBWP4 that the UE 1 currently stays on since the active downlink BWP DLBWP4 does not have correspondence with the uplink BWP ULBWP3 on which the UE 1 transmits the preamble 102 and the BS 2 would only transmit the random access response message 202 on the downlink BWP DLBWP3 corresponding to the uplink BWP ULBWP3. Thus, in order to receive random access response message 202, the UE 1 has to switch from the current active downlink BWP DLBWP4 to the active downlink BWP DLBWP3 corresponding to the active uplink BWP ULBWP3 according to the linkage between the uplink BWPs and the downlink BWPs, as shown in FIG. 4B. Therefore, after switching the downlink BWP, the active downlink BWP of the UE 1 has changed from the downlink BWP DLBWP4 to the downlink BWP DLBWP3.

It shall be noticed that, the present invention takes that the BS configures four uplink BWPs and four downlink BWPs for a UE as example. However, those of ordinary skill in the art can appreciate that, the BS may configure other number of uplink BWPs and other number of downlink BWPs, and such a configuration must meet the maximum number of configurable uplink BWPs and the maximum number of configurable downlink BWPs (e.g., four uplink BWPs and four downlink BWPs) defined in the 5G mobile communication system standard, and thus it will be not further described herein.

In the present invention, the linkage can present the correspondence between the uplink BWPs and the downlink BWPs and the correspondence may be one-on-one or many-to-one. To be more specific, each of the uplink BWPs has an uplink BWP identifier and each of the downlink BWPs has a downlink BWP identifier. The linkage defines that the correspondence between the uplink BWP identifiers and the downlink BWP identifiers, and it can be stored in the UE 1 (e.g., saved as a mapping table, but not limited thereto).

For example, when the linkage defines that the uplink BWP identifiers corresponds to the downlink BWP identifiers, one-on-one, the linkage may show that the uplink BWP ULBWP1 corresponds to the downlink BWP DLBWP1, the uplink BWP ULBWP2 corresponds to the downlink BWP DLBWP2, the uplink BWP ULBWP3 corresponds to the downlink BWP DLBWP3 and the uplink BWP ULBWP4 corresponds to the downlink BWP DLBWP4.

As another example, when the linkage defines that at least one of the uplink BWP identifiers corresponds to one of the downlink BWP identifiers (i.e., the linkage may define that multiple uplink BWPs corresponds to the same downlink BWP), the linkage may show that the uplink BWP ULBWP1 corresponds to the downlink BWP DLBWP1, the uplink BWP ULBWP2 corresponds to the downlink BWP DLBWP2, and the uplink BWPs ULBWP3, ULBWP4 correspond to the downlink BWP DLBWP3.

Figure 5:
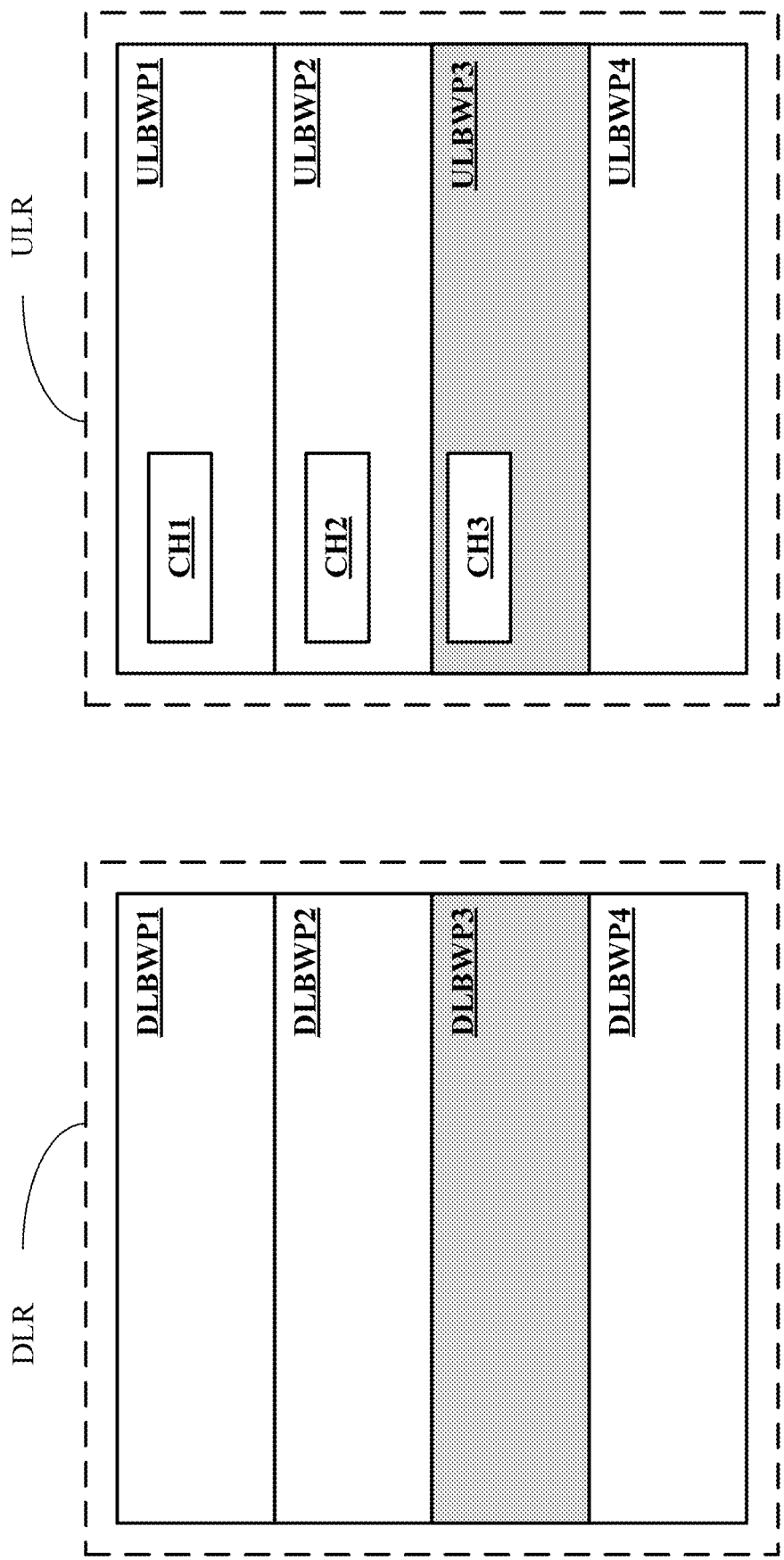
FIG. 5 depicts an implementation scenario of the configuration of the PRACHs on some uplink BWPs only according to the present invention.

It shall be appreciated that, this embodiment assumes that BS 2 configures the PRACH on each uplink BWP (e.g., the PRACHs CH1-CH4) and configures the common search space for receiving random access response message on each downlink BWP. However, in other embodiment, the BS 2 can determine that which uplink BWP needs to be configured with a PRACH and which downlink BWP needs to be configured with the common search space for receiving random access response message. For example, as shown in FIG. 5, the BS 2 may only configure the PRACHs CH1, CH2, CH3 on the uplink BWPs ULBWP1, ULBWP2, ULBWP3 and configure the common search space for receiving random access response message on the downlink BWPs DLBWP1, DLBWP3. Therefore, the aforementioned linkage would only exist between the uplink BWPs with the PRACHs and the downlink BWPs with the common search spaces for receiving the random access response message.

In addition, the BS 2 may inform the UE 1 about the linkage when configuring the uplink BWPs and the downlink BWPs to the UE 1, e.g., through a higher layer signaling. Besides, the BS 2 may adjust the linkage dynamically and inform the UE 1 about the updated linkage through a downlink control information (DCI) or a medium access control (MAC) control element (CE). Furthermore, for different UEs, the configuration of the uplink BWPs and the downlink BWPs may be the same or different. In other words, the UE 1a, 1b, 1c may have different configuration of the uplink BWPs and the downlink BWPs. In other embodiments, the linkage may be pre-configured.

Figure 6:
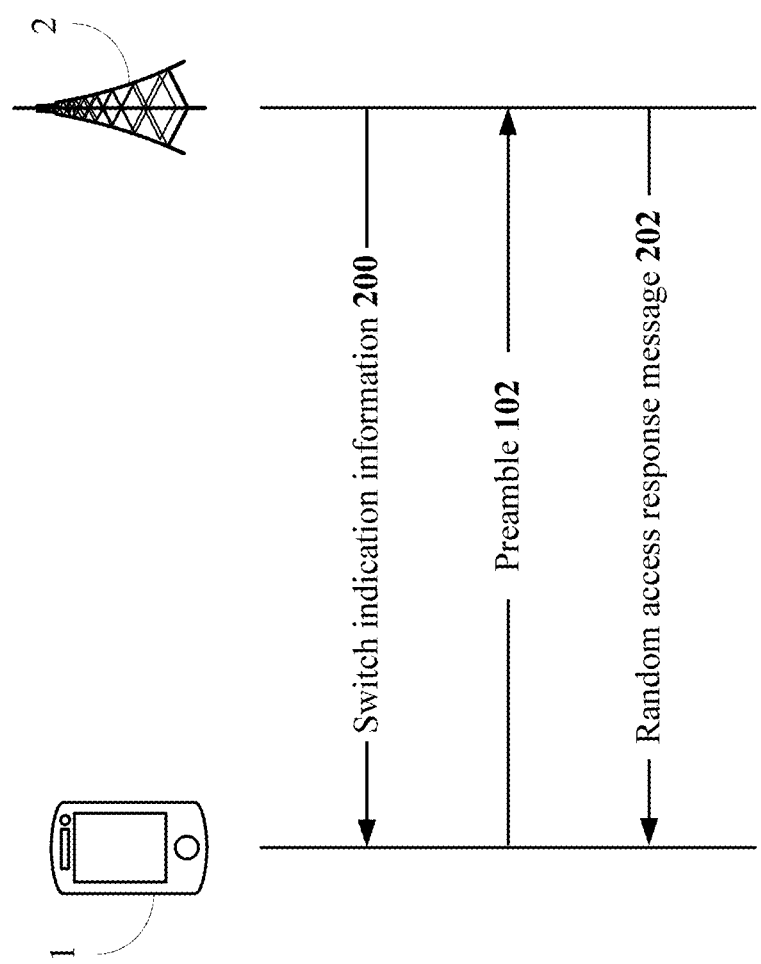
FIG. 6 depicts an implementation scenario of signal transmission between the UE 1 and the BS 2 according to the present invention.
Figure 7A:
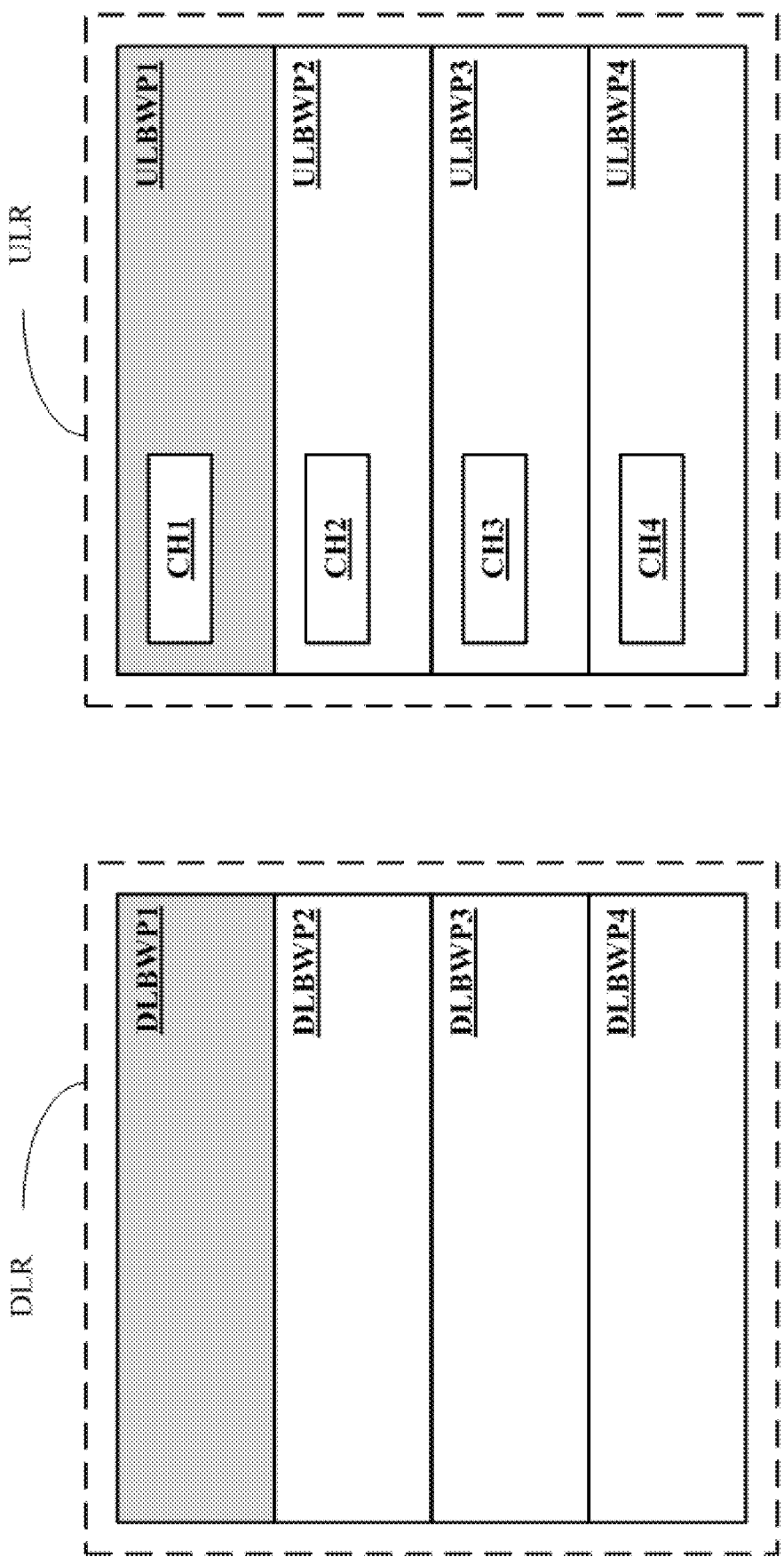
FIGS. 7A-7C depict an implementation scenario in which the UE 1 switches the uplink BWP and the downlink BWP according to the linkage.
Figure 7B:
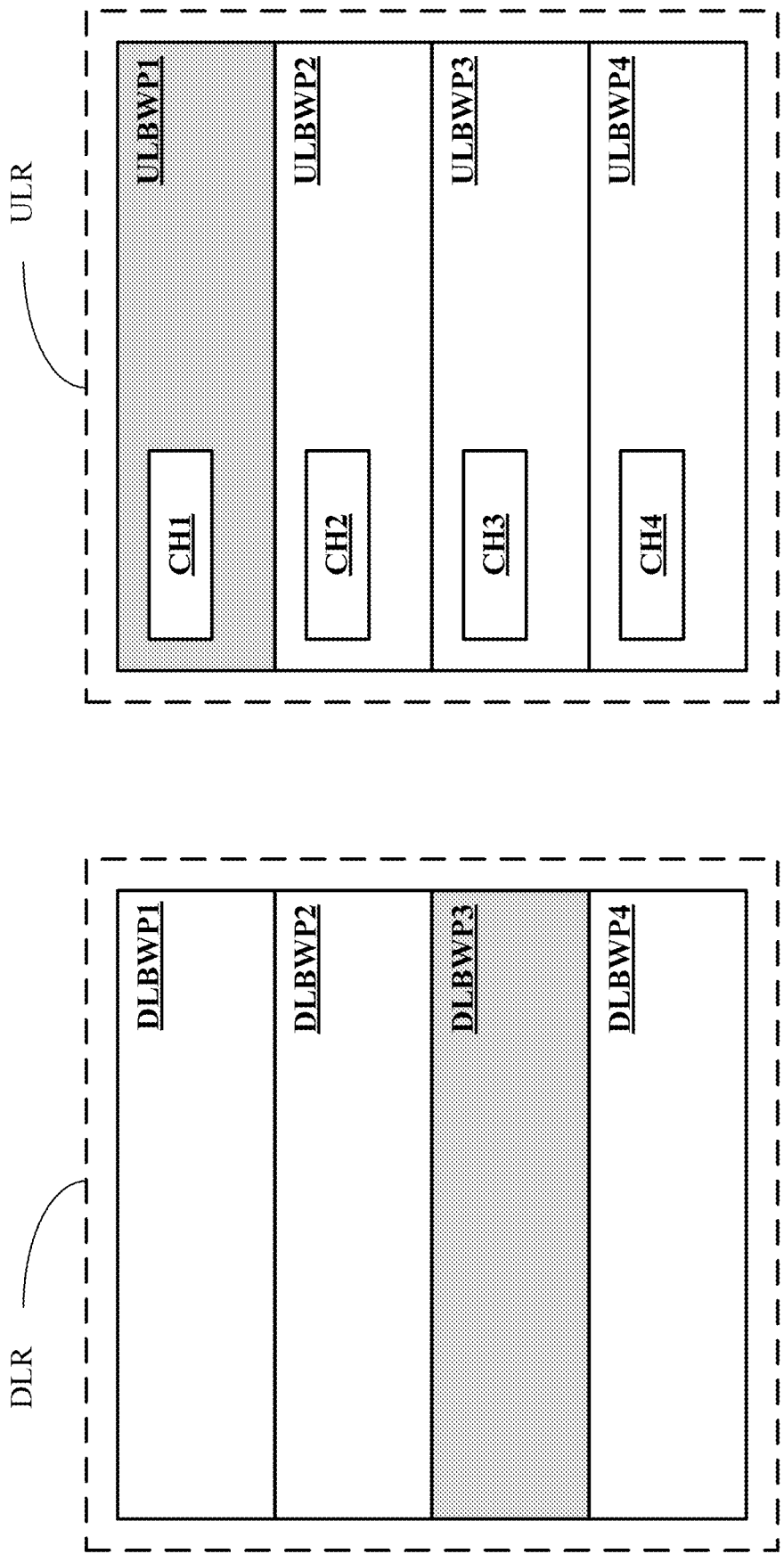
Figure 7C:
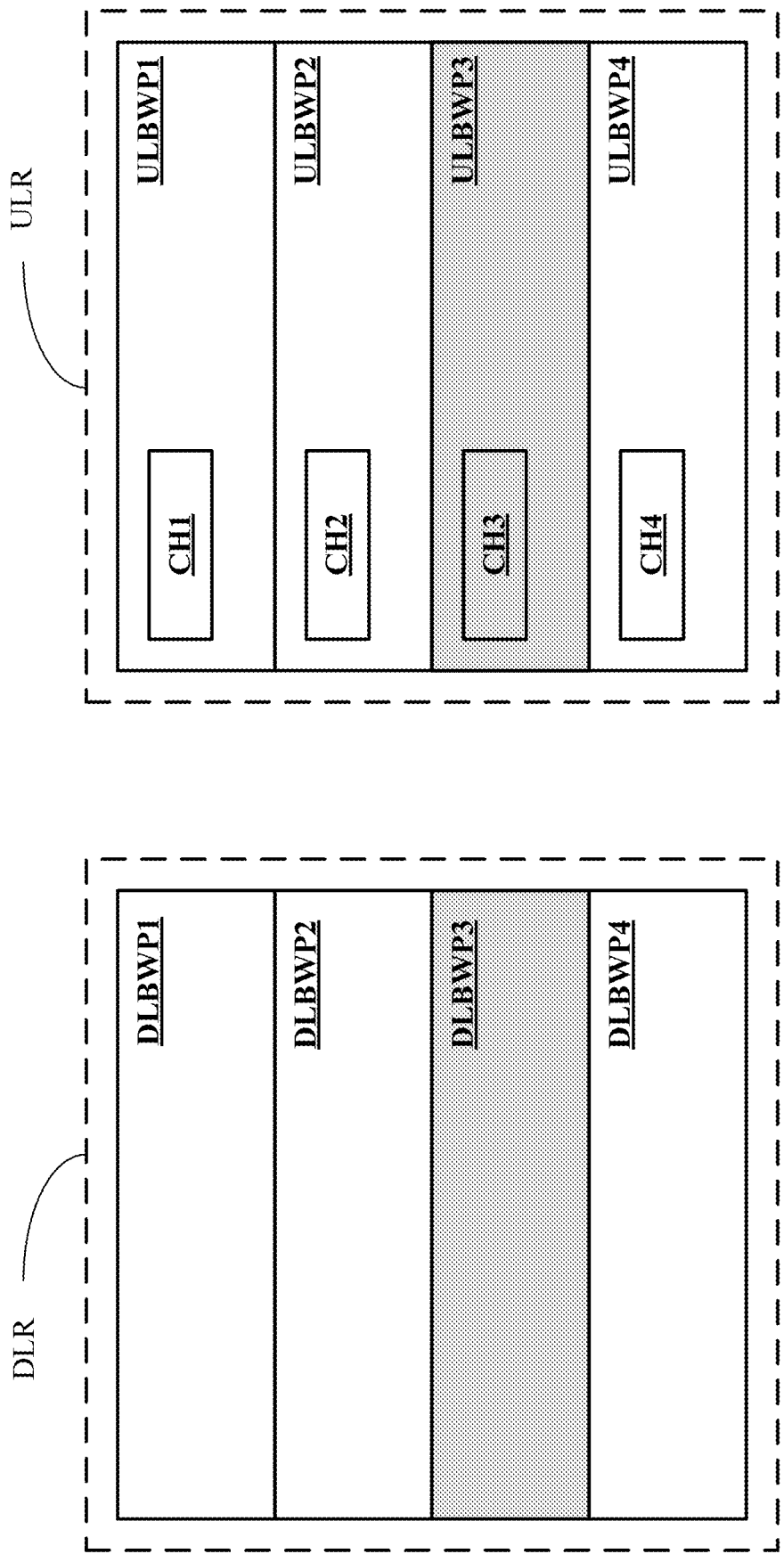

The second embodiment of the present invention is as shown in FIG. 6 and FIGS. 7A-7C. FIG. 6 depicts an implementation scenario of signal transmission between the UE 1 and the BS 2 according to the present invention. FIGS. 7A-7C depict an implementation scenario in which the UE 1 switches the uplink BWP and the downlink BWP according to the linkage. Different from the first embodiment in which the UE 1 switches to the active downlink BWP DLBWP3 corresponding to the active uplink BWP ULBWP3 in response to the preamble 102 is transmitted on the active uplink BWP ULBWP3, the UE 1 in this embodiment selects the corresponding active uplink BWP and switches to the corresponding active uplink BWP to transmit the preamble 102 in response to the active downlink BWP that the UE 1 is staying on.

Specifically, after establishing the connection with the BS 2, the UE 1 will stay on the initial downlink BWP DLBWP1 and the initial uplink BWP ULBWP1, as shown in FIG. 7A. When the BS 2 is going to transmit downlink data to the UE 1, the BS 2 transmits the switch indication information 200 to the UE 1 to make the UE 1 switch from the initial downlink BWP DLBWP1 to the active downlink BWP DLBWP3 according to the switch indication information 200, as shown in FIG. 7B. Meanwhile, the uplink BWP which the UE 1 stays on is still the initial uplink BWP ULBWP1. The BS 2 may inform the UE 1 about the switch indication information 200 through the higher layer signaling, e.g., the radio resource control (RRC) message. Besides, the BS 2 may also inform the UE 1 about the switch indication information 200 through the DCI or the MAC CE.

When the UE 1 would like to initiate a random access procedure for a scheduling request by transmitting the preamble 102, the UE 1 will switch from the initial uplink BWP ULBWP1 to the active uplink BWP ULBWP3 according to the linkage first, and then transmit the preamble 102 to the BS 2 on the PRACH CH3 of the active uplink BWP ULBWP3, corresponding to the active downlink BWP DLBWP3, as shown in FIG. 7C.

In other embodiment, if the BS 2 determines that the UE 1 may need to transmit uplink data after the BS 2 transmitted the downlink data to the UE 1, the switch indication information 200 transmitted by the BS 2 may be also used to instruct the UE 1 to switch to the active downlink BWP (e.g., the active downlink BWP DLBWP3) and the active uplink BWP (e.g., the active uplink BWP ULBWP3). As known from the above, the UE 1 of the present invention may switch the active downlink BWP according to the active uplink BWP or switch the active uplink BWP according to the active downlink BWP based on the linkage. Moreover, according to the linkage, the BS 2 can directly instruct the UE 1 to switch to the corresponding active downlink and uplink BWPs through the switch indication information 200.

Figure 8A:
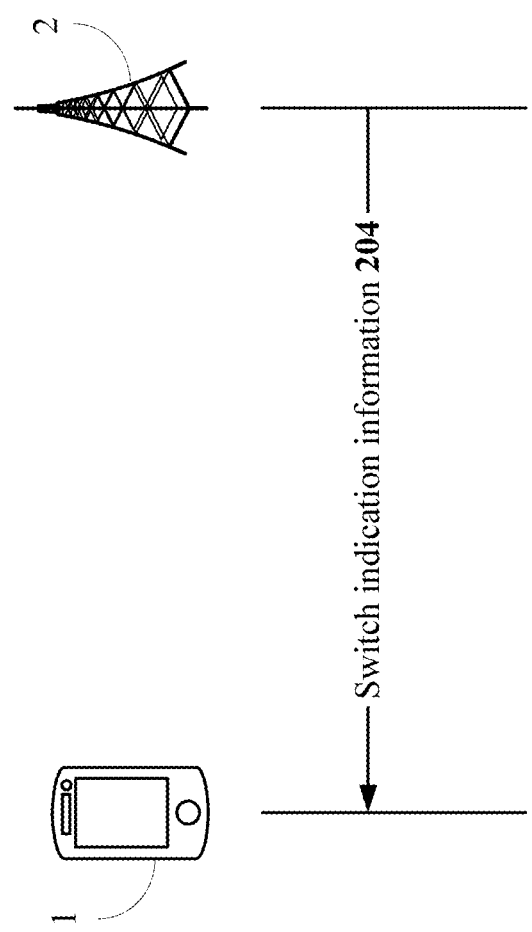
FIGS. 8A-8D depict an implementation scenario in which the UE 1 switches from the active downlink BWP to the initial downlink BWP or the default downlink BWP.
Figure 8B:
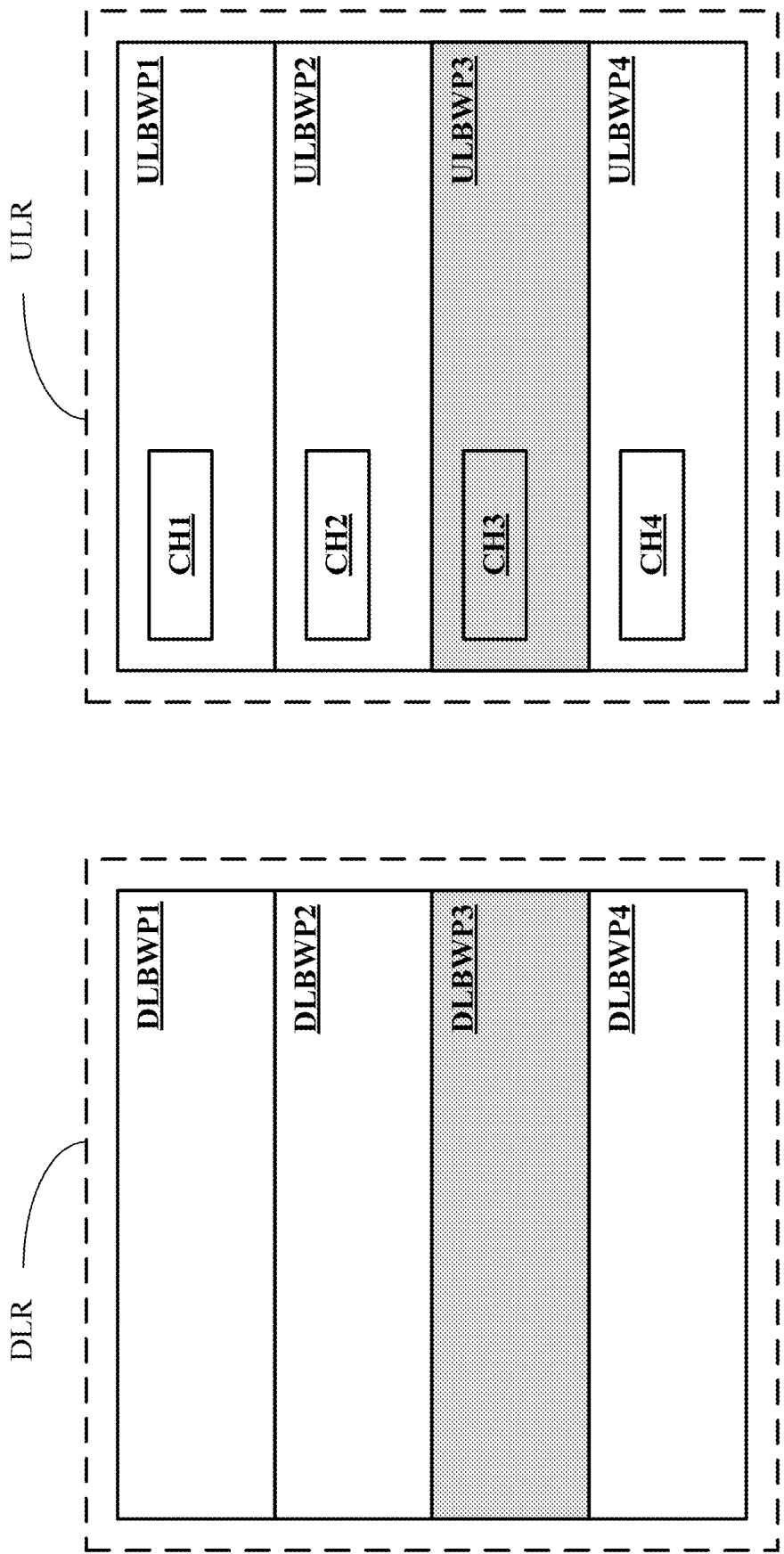
Figure 8C:
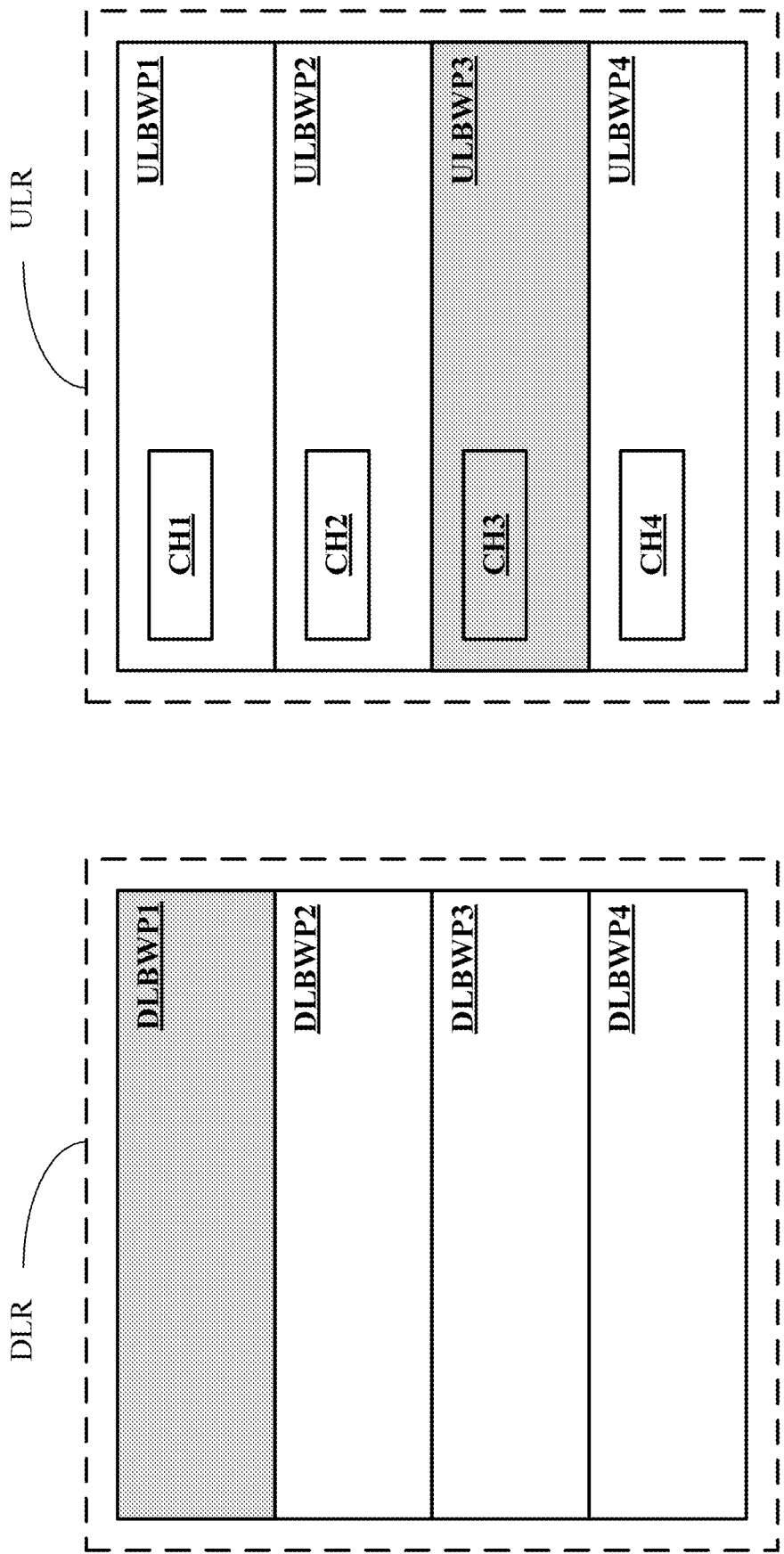

The third embodiment of the present invention is as shown in FIGS. 8A-8C. FIGS. 8A-8C depict an implementation scenario in which the UE 1 switches from the active downlink BWP to the initial downlink BWP. As usual, the BS 2 transmits the common DCI on the initial downlink BWP DLBWP1. After the UE 1 initiates the random access procedure to request the BS 2 for the on-demand SI or once the BS 2 has updated its SI, the BS 2 will use the message-based method to transmit the switch indication information 204 to the UEs (e.g., the UE 1) which are staying on other downlink BWPs so as to inform them to switch to the initial downlink BWP DLBWP1 to receive the common DCI.

For example, as shown in FIGS. 8B-8C, it is assumed that the BS 2 configures the downlink BWP DLBWP3 as the active downlink BWP to the UE 1 at first, and after the BS 2 updates its SI, the BS 2 will transmit the updated SI on the initial downlink BWP DLBWP1 and transmit switch indication information 200 to the UE 1 to make the UE 1 switch from the active downlink BWP DLBWP3 to the initial downlink BWP DLBWP1.

Figure 8D:
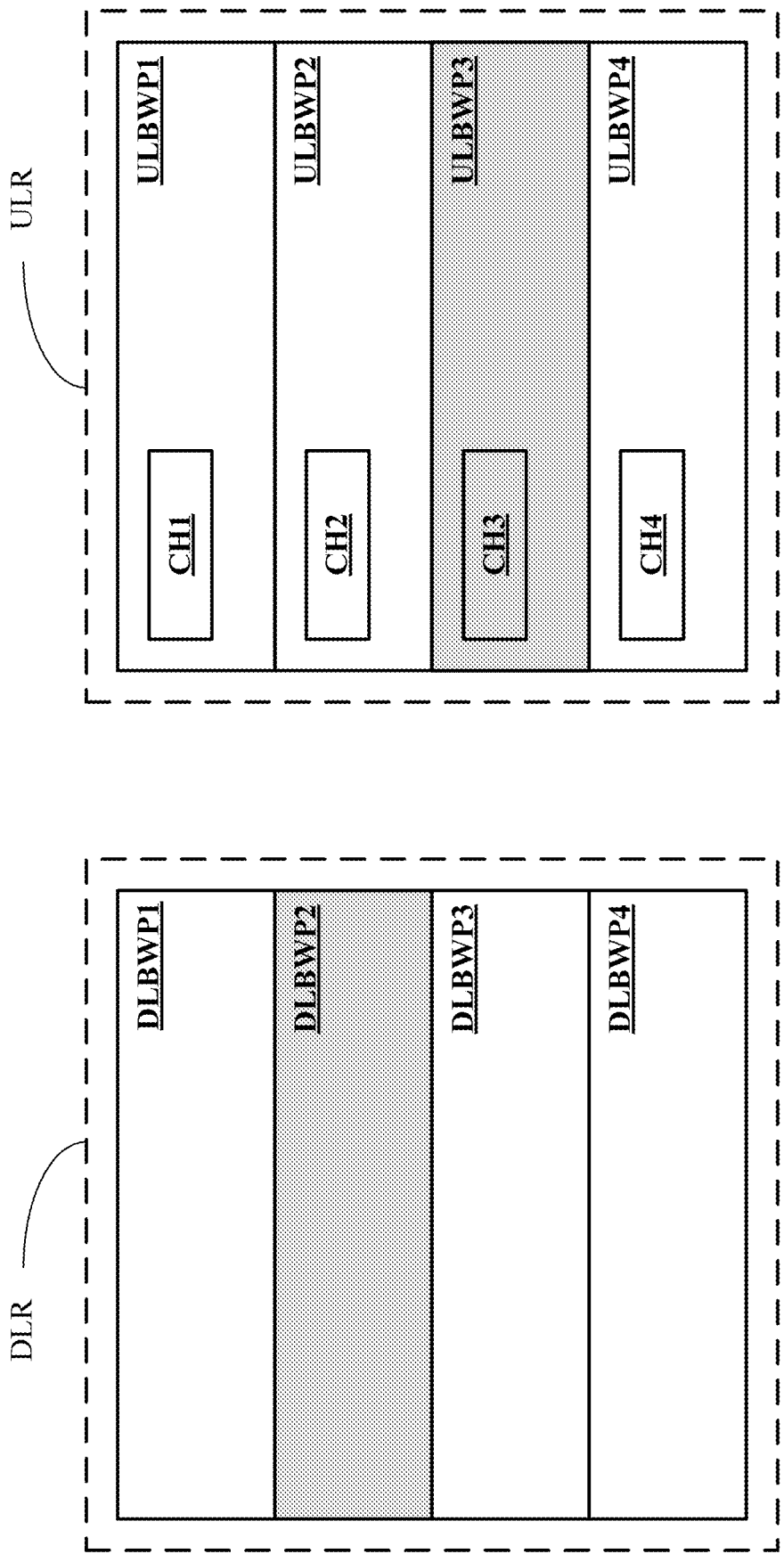

The fourth embodiment of the present invention is as shown in FIGS. 8A-8B and 8D. FIGS. 8A-8B and 8D depict an implementation scenario in which the UE 1 switches from the active downlink BWP to the default downlink BWP. The downlink BWPs configured to the UE 1 by the BS 2 further includes the default downlink BWP DLBWP2 in addition to the initial downlink BWP DLBWP1. The BS 2 would transmit the common DCI on both the initial downlink BWP DLBWP1 and the default downlink BWP DLBWP2. For example, after the UE 1 initiates the random access procedure to request the BS 2 for the on-demand SI or once the BS 2 has updated its SI, the BS 2 will use the message-based method to transmit the switch indication information 204 to the UEs (e.g., the UE 1) which are staying on other downlink BWPs (i.e., the downlink BWPs except the initial downlink BWP and the default downlink BWP) to informs them to switch to the default downlink BWP DLBWP2 to receive the common DCI.

For example, as shown in FIGS. 8B and 8D, it is assumed that the BS 2 configures the downlink BWP DLBWP3 as the active downlink BWP to the UE 1 at first, after the BS 2 updates its SI, the BS 2 will transmit the updated SI on the initial downlink BWP DLBWP1 and the default downlink BWP DLBWP2 and transmit switch indication information 204 to the UE 1 to make the UE 1 switch from the active downlink BWP DLBWP3 to the default downlink BWP DLBWP2. Furthermore, since the initial downlink BWP DLBWP1 is usually used for the UE which just establishes connection with the BS 2, the BS 2 may configure the default downlink BWP DLBWP2 additionally for the UE which is not staying on the initial downlink BWP DLBWP1 or the default downlink BWP DLBWP2 to switch to the default downlink BWP DLBWP2 after receiving the switch indication information 204 so as to prevent too many UEs staying on the initial downlink BWP at the same time, thereby balancing the radio resource utilization.

Figure 9A:
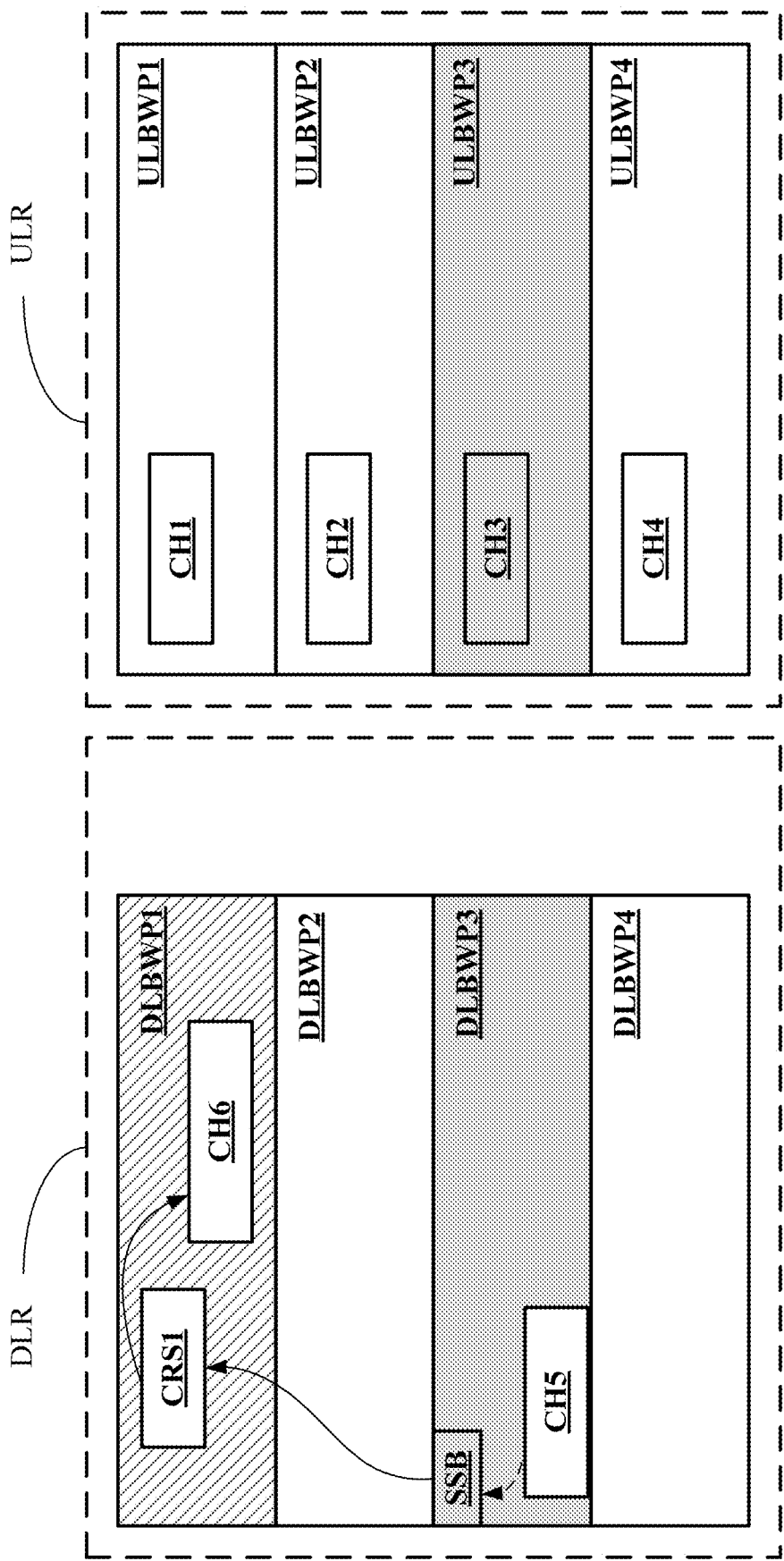
FIGS. 9A-9B depict an implementation scenario in which the UE 1 switches from the active downlink BWP to the initial downlink BWP.

The fifth embodiment of the present invention is as shown in FIG. 9A. The fifth embodiment is an extension of the third embodiment. In this embodiment, the BS 2 transmits the switch indication information 204 on the synchronization signal block SSB. For example, the BS 2 may transmit the switch indication information 204 on the physical broadcast channel (PBCH) of the synchronization signal block SSB, e.g., indicating the switch indication information 204 through the specific field of the master information block (MIB). As another example, the BS 2 may transmit a specific synchronization signal carrying a specific sequence on the synchronization signal block SSB to the UE 1 to indicate the switch indication information 204 through the specific sequence. The specific synchronization signal may be a primary synchronization signal (PSS), a secondary synchronization signal (SSS) or the combination thereof.

In this embodiment, the switch indication information 204 is only used for instructing the UE 1 to switch to the initial downlink BWP DLBWP1 without further indicating the position of the updated SI on the physical downlink shared channel (PDSCH) CH6. Therefore, after switching to the initial downlink BWP DLBWP1, the UE 1 needs to receive common DCI in the control resource set (CORESET) CRS1 first so as to obtain the position of the updated SI on the PDSCH CH6, and then receive the updated SI on the PDSCH CH6.

Figure 9B:
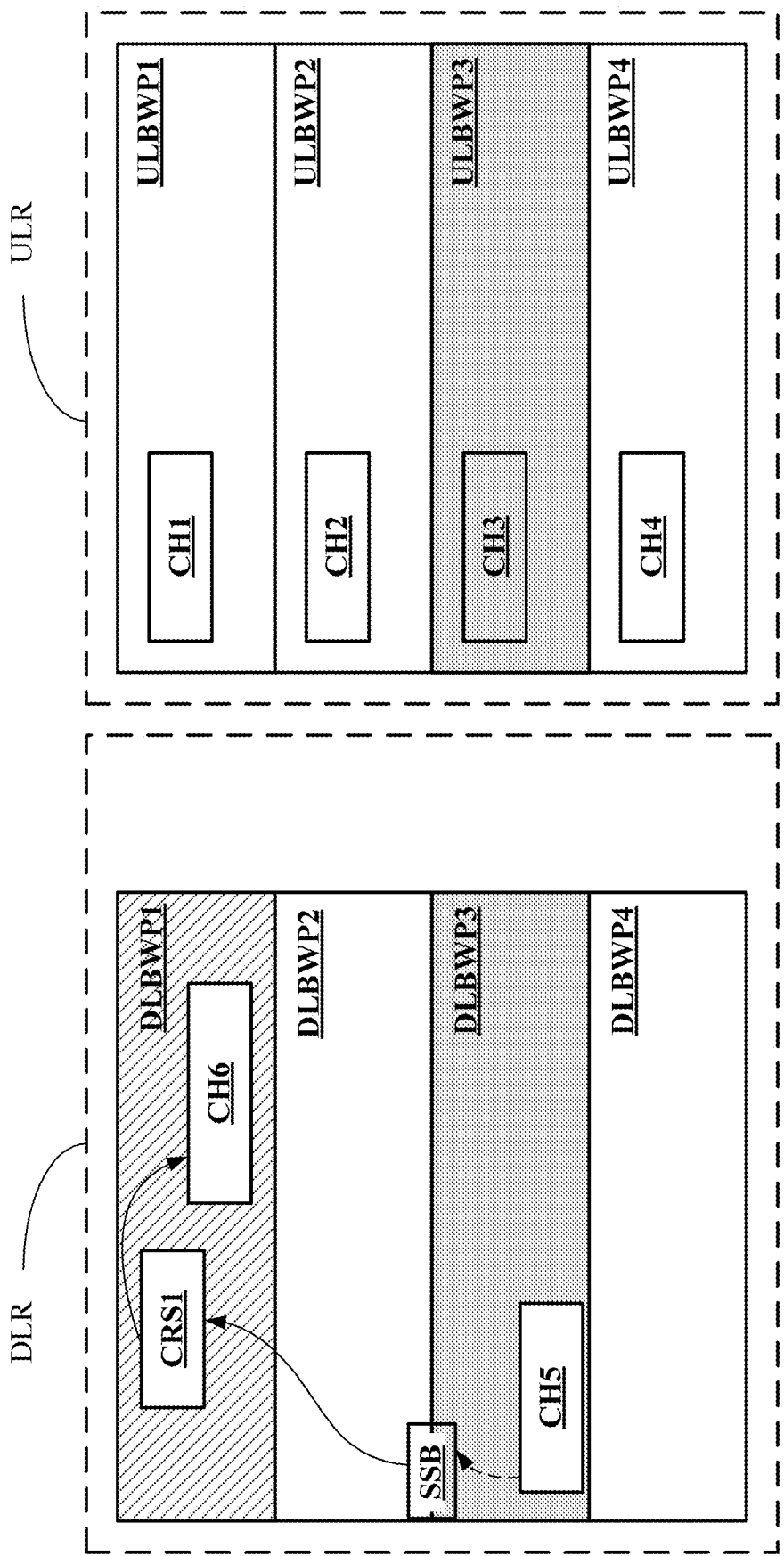

Besides, if the UE 1 receives the switch indication information 204 on the synchronization signal block SSB while receiving the downlink data on the PDSCH CH5, the UE 1 may switch to the initial downlink BWP DLBWP1 after finishing receiving the downlink data or may directly terminate receiving the downlink data on the PDSCH CH5 and switch to the initial downlink BWP DLBWP1. It shall be noted that, in this embodiment, the synchronization signal block SSB is configured on the active downlink BWP of the UE. However, if the UE has higher bandwidth capability, the synchronization signal block SSB may be configured on the radio resource bridging two adjacent downlink BWPs, as shown in FIG. 9B. In this way, the UE may be informed whether to switch the downlink BWP if the bandwidth capability of the UE can cover both of the active downlink BWP and the synchronization signal block SSB.

Figure 10A:
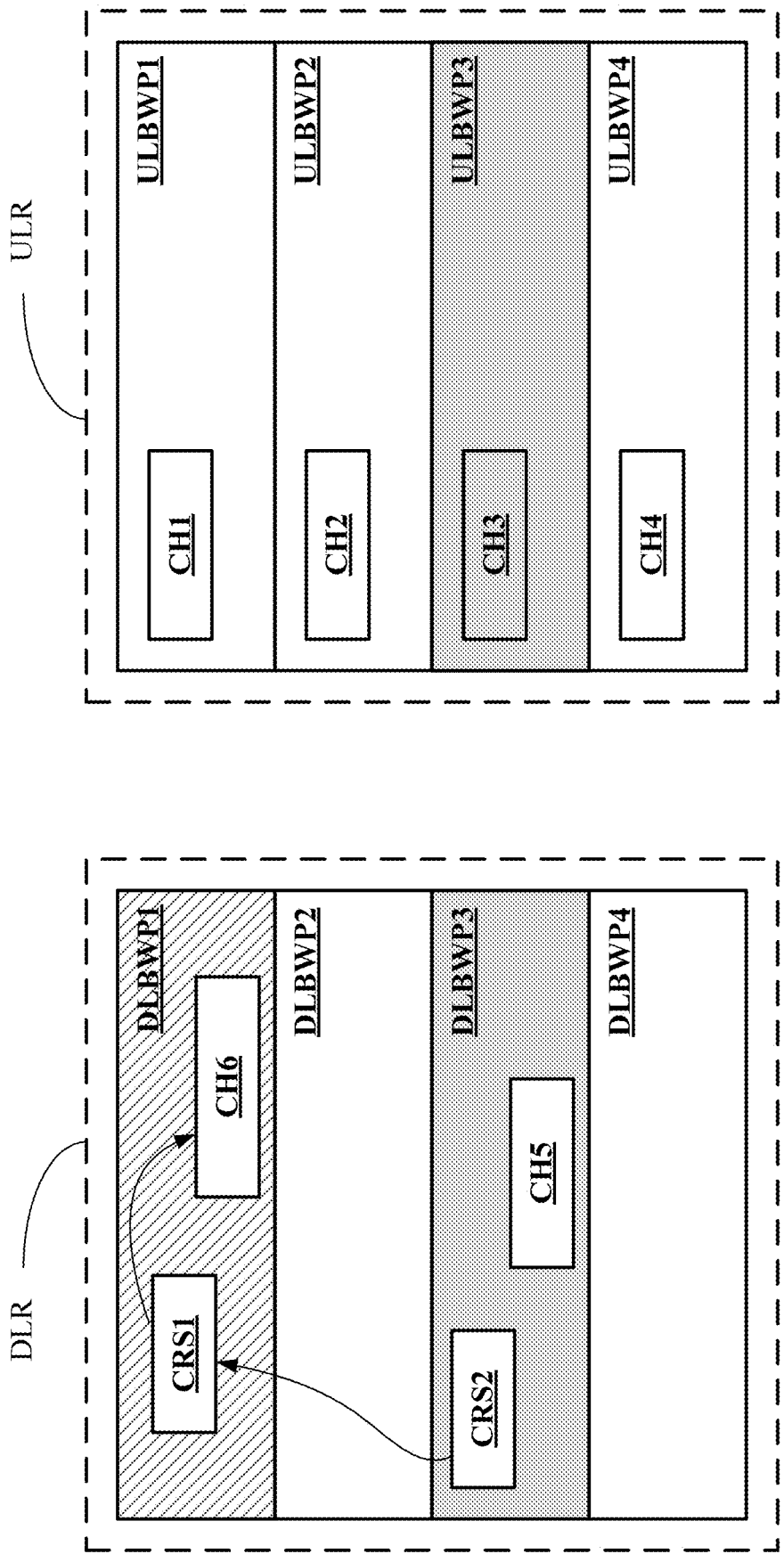
FIGS. 10A-10D depict an implementation scenario in which the UE 1 switches from the active downlink BWP to the initial downlink BWP or the default downlink BWP.
Figure 10B:
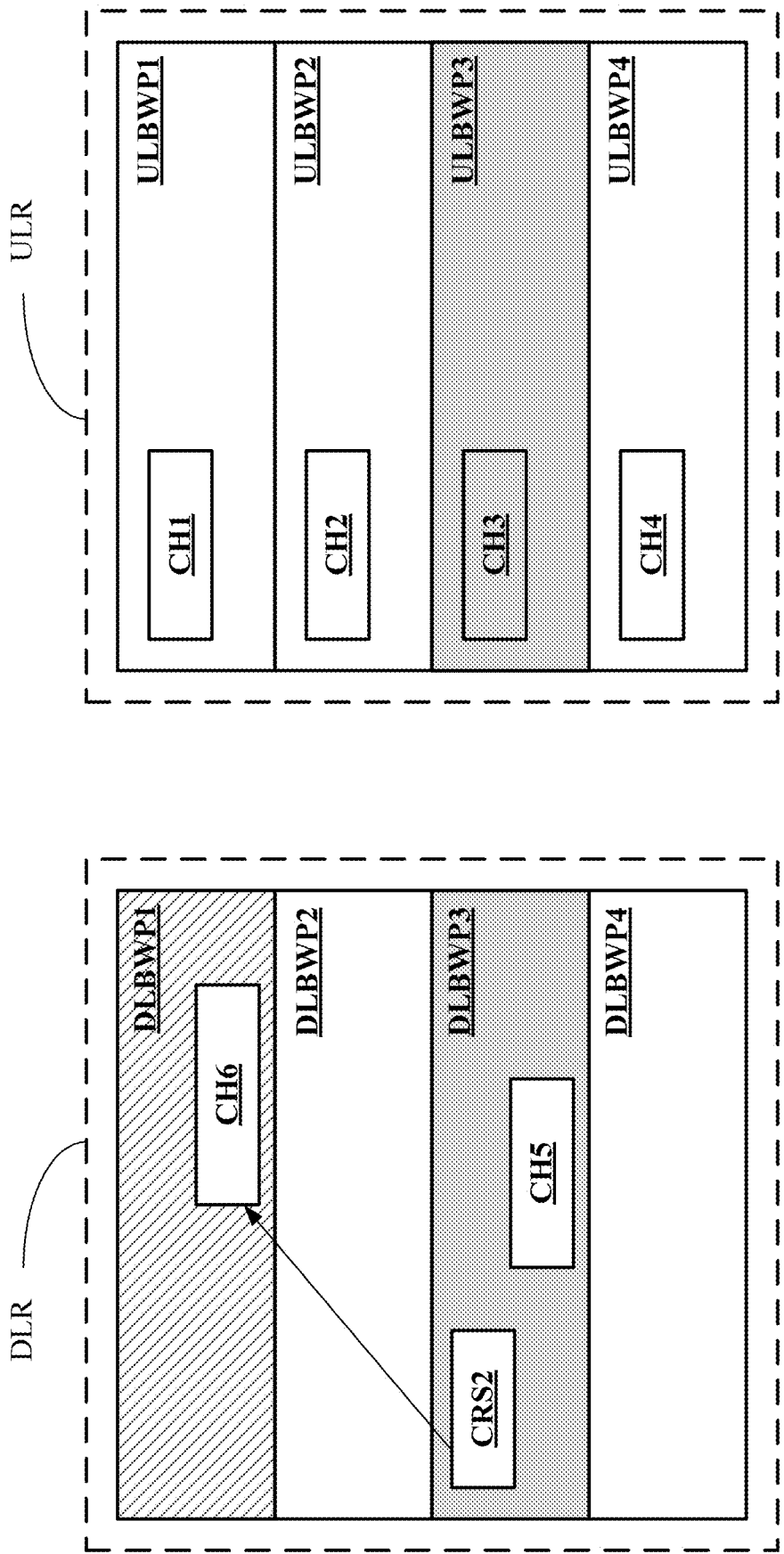

The sixth embodiment of the present invention is as shown in FIGS. 10A-10B. The sixth embodiment is also an extension of the third embodiment. Different from the fifth embodiment, in this embodiment, the BS 2 transmits group-common DCI including the switch indication information 204 to at least one specific UE (e.g., the UE whose the active downlink BWP is the downlink BWP DLBWP3) on the CORESET CRS2 of the active downlink BWP DLBWP3. Therefore, in this embodiment, the BS 2 further configures the common search space for receiving the group-common DCI on the downlink BWPs.

In an embodiment, the group-common DCI may only carry the switch indication information 204, and the UE 1 may still need to receive the common DCI on the CORESET CRS1 first to obtain the position of the updated SI on the PDSCH CH6 after switching to the initial downlink BWP DLBWP1 so as to retrieve the updated SI on the PDSCH CH6, as shown in FIG. 10A.

In other embodiment, in addition to carrying the switch indication information 204, the group-common DCI may further indicate a radio resource on the PDSCH CH6 of the initial downlink BWP DLBWP1 to make the UE 1 directly retrieve the updated SI from the radio resource on the PDSCH CH6 after switching to the initial downlink BWP DLBWP1, as shown in FIG. 10B.

Please refer to FIGS. 10A-10B again for the seventh embodiment of the present invention. Different from the sixth embodiment, the BS 2 in this embodiment transmits UE-specific DCI including the switch indication information 204 to a specific UE (e.g., the UE 1a in FIG. 2) on the CORSET CRS2 of the active downlink BWP DLBWP3.

In an embodiment, the UE-specific DCI may only carry the switch indication information 204, and the UE 1 may still need to receive the common DCI on the CORSET CRS1 to obtain the position of the updated SI on the PDSCH CH6 first after switching to the initial downlink BWP DLBWP1 so as to retrieve the updated SI on the PDSCH CH6, as shown in FIG. 10A.

In other embodiment, in addition to carrying the switch indication information 204, the UE-specific DCI may further indicate a radio resource on the PDSCH CH6 of the initial downlink BWP DLBWP1 to make the UE 1 directly retrieve the updated SI from the radio resource on the PDSCH CH6 after switching to the initial downlink BWP DLBWP1, as shown in FIG. 10B.

Figure 10C:
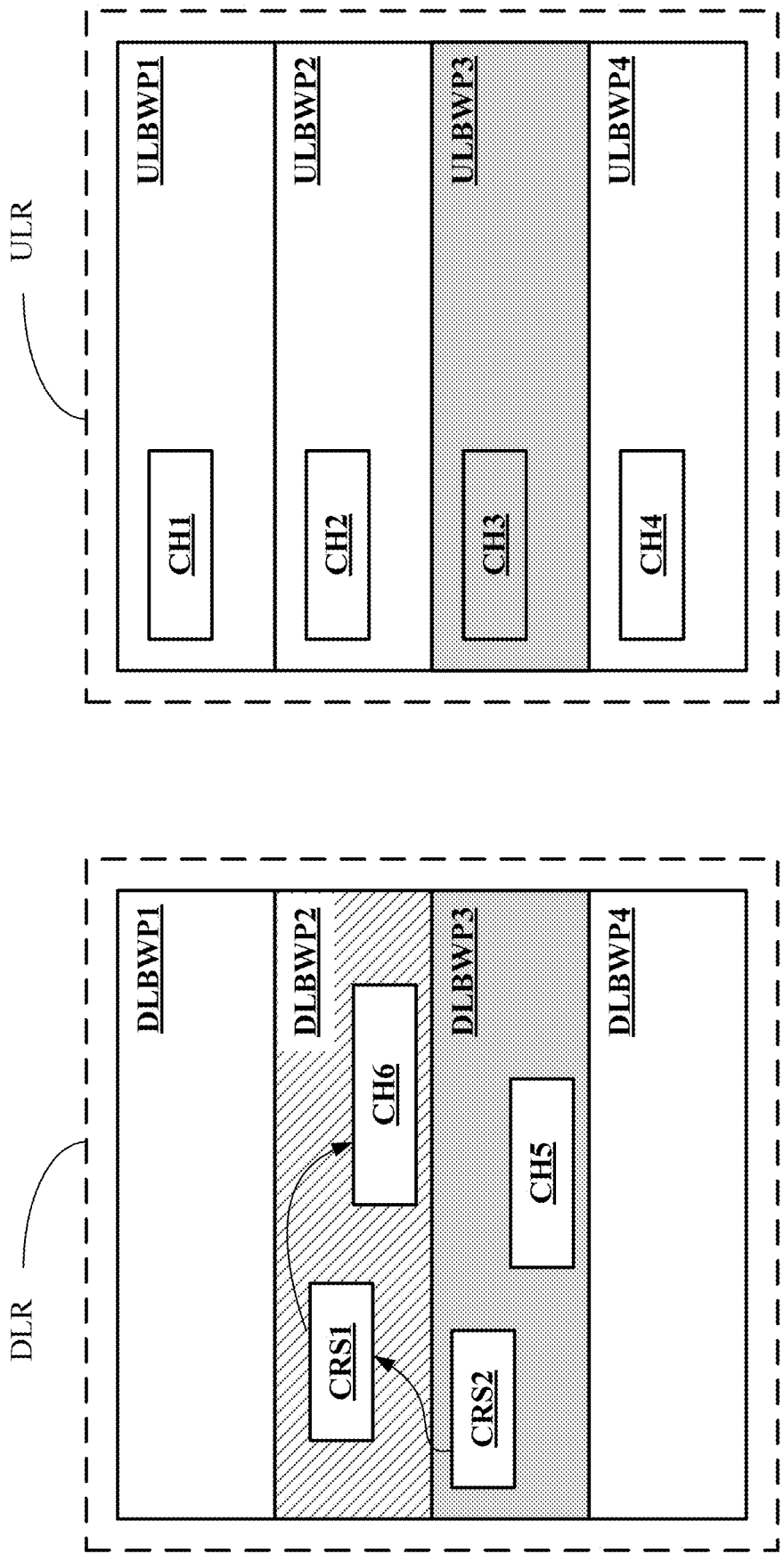
Figure 10D:
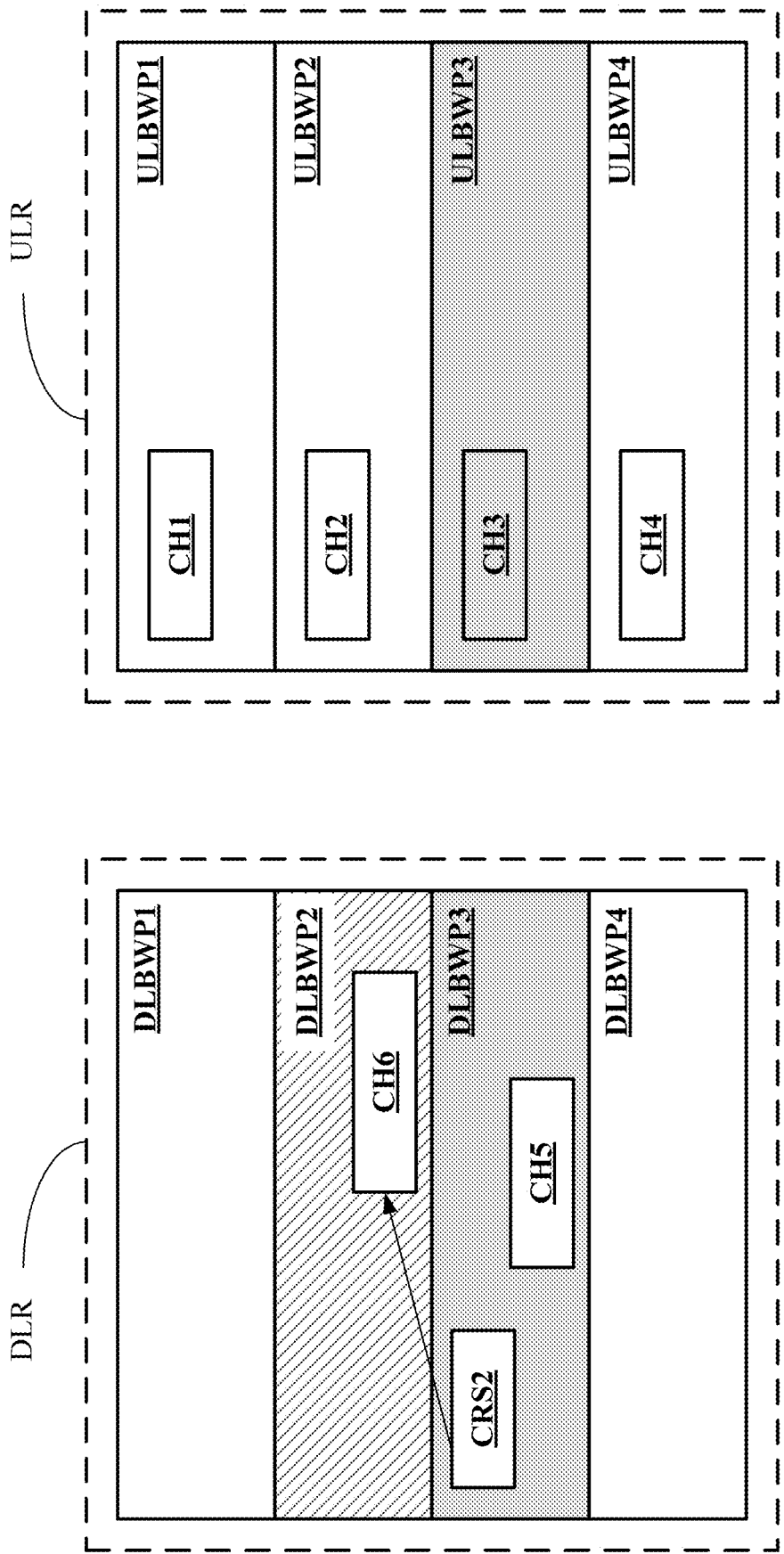

The eighth embodiment of the present invention is as shown in FIGS. 10C-10D. The eighth embodiment is an extension of the fourth embodiment. Different from the seventh embodiment, in this embodiment, the downlink BWPs configured to the UE 1 by the BS 2 further includes the default downlink BWP DLBWP2 in addition to the initial downlink BWP DLBWP1. Therefore, the BS 2 in this embodiment would transmit the switch indication information 204 through the UE-specific DCI to make the UE 1 switch to the default downlink BWP DLBWP2 according to the switch indication information 204.

Similarly, in another embodiment, the UE-specific DCI may only carry the switch indication information 204, and the UE 1 may still need to receive the common DCI on the control resource set CRS1 to obtain the position of the updated SI on the PDSCH CH6 first after switching to the default downlink BWP DLBWP2 so as to retrieve the updated SI on the PDSCH CH6, as shown in FIG. 10C.

Furthermore, in other embodiments, in addition to carrying the switch indication information 204, the UE-specific DCI may further indicate a radio resource on the PDSCH CH6 of the default downlink BWP DLBWP2 to make the UE 1 directly retrieve the updated SI from the radio resource on the PDSCH CH6 after switching to the default downlink BWP DLBWP2, as shown in FIG. 10D.

Figure 11A:
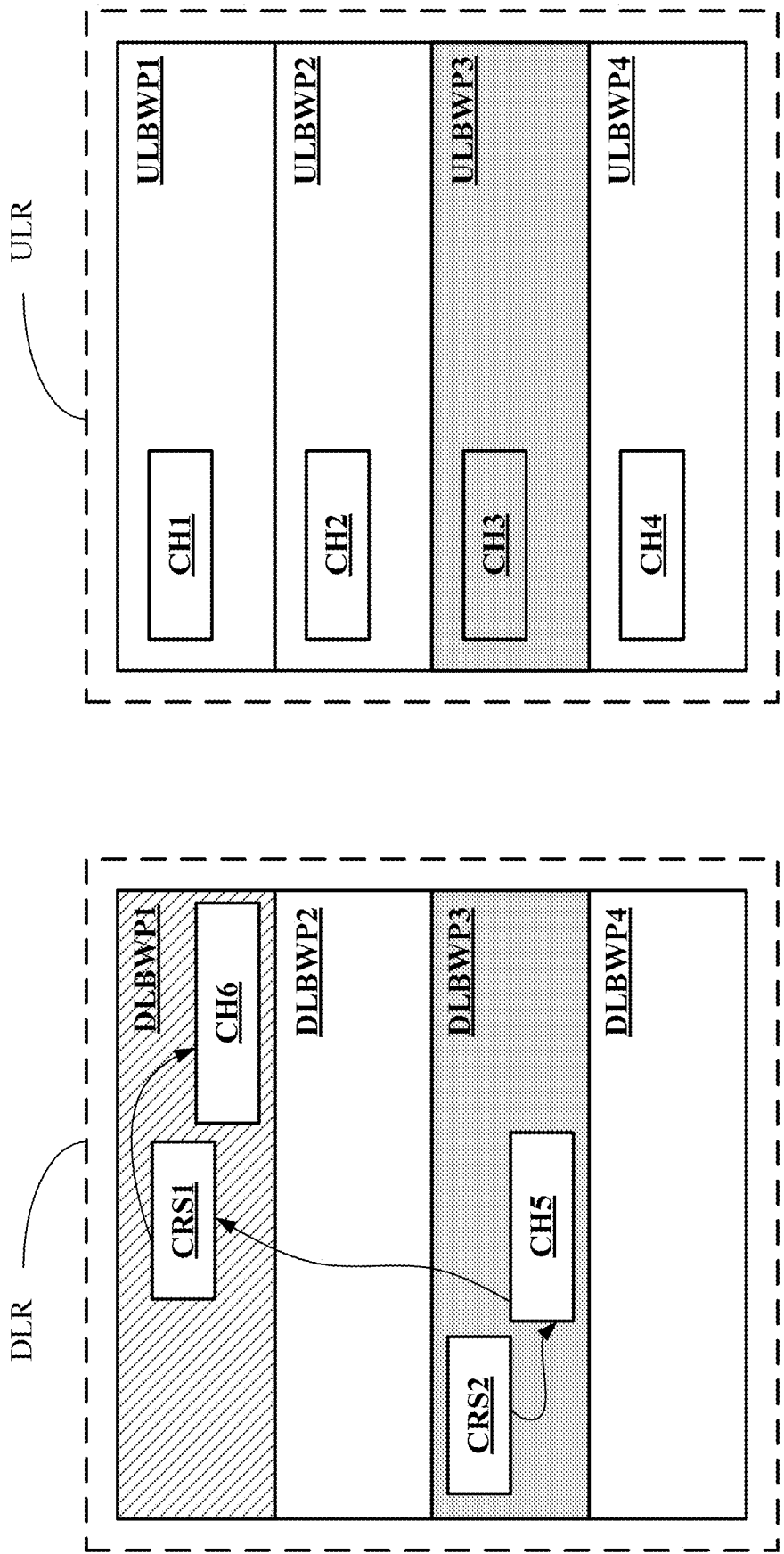
FIGS. 11A-11B depict an implementation scenario in which the UE 1 switches from the active downlink BWP to the initial downlink BWP or the default downlink BWP.

The ninth embodiment of the present invention is as shown in FIG. 11A. The ninth embodiment is also an extension of the third embodiment. Different from the fifth and sixth embodiments, in this embodiment, the BS 2 transmits a MAC CE or a paging message carrying the switch indication information 204 on the PDSCH CH5 of the active downlink BWP DLBWP3.

To be more specific, when the BS 2 transmits the switch indication information 204 through the MAC CE, the UE 1 needs to receive the UE-specific DCI on the CORSET CRS1 first and retrieves the downlink data on the radio resource of the PDSCH CH5 indicated by the UE-specific DCI, wherein the MAC CE of the downlink data records the switch indication information 204. Besides, when the BS 2 transmits the switch indication information 204 through the paging message, the BS 2 further configures the common search space for receiving the paging message on the downlink BWPs, so the UE 1 needs to receive the common DCI on the CORSET CRS1 first and retrieves the paging message indicated thereof on the radio resource of the PDSCH CH5, wherein the paging message may record the UE identifier of the UE which the BS 2 would like to instruct to switch to the initial downlink BWP DLBWP1. Therefore, in this embodiment, the BS 2 can transmit the switch indication information 204 to the UE 1 through the MAC CE or the paging message to make the UE switch to the initial downlink BWP DLBWP1 according to the switch indication information 204.

Figure 11B:
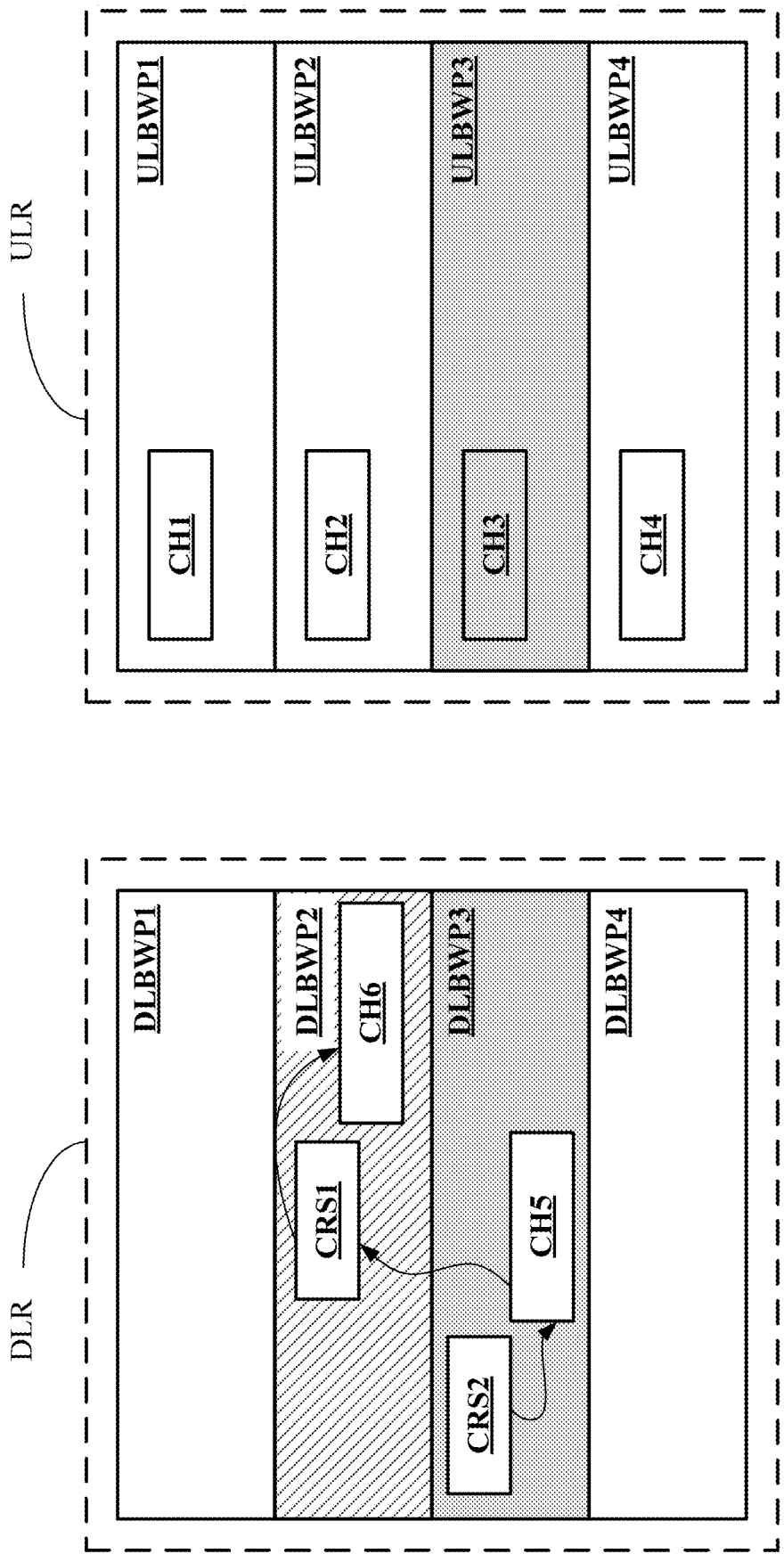

The tenth embodiment of the present invention is as shown in FIG. 11B. The tenth embodiment is also an extension of the fourth embodiment. Different from the ninth embodiment, in this embodiment, the downlink BWPs configured to the UE 1 by the BS 2 further includes the default downlink BWP DLBWP2 in addition to the initial downlink BWP DLBWP1. Therefore, in this embodiment, the BS 2 would transmit the switch indication information 204 through the MAC CE or paging message to make the UE 1 switch to the default downlink BWP DLBWP2 according to the switch indication information 204.

Figure 12A:
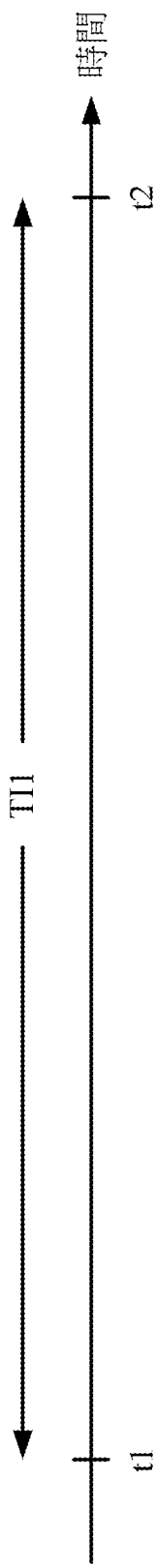
FIGS. 12A-12C depict an implementation scenario in which the UE 1 switches from the active downlink BWP to the initial downlink BWP after the timer is expired.
Figure 12B:
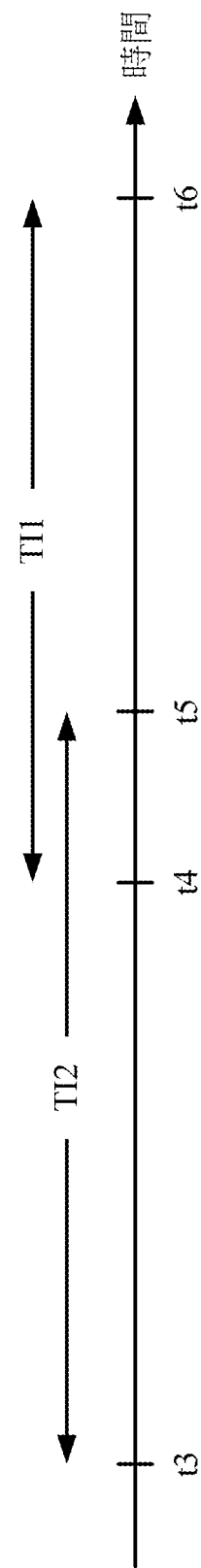
Figure 12C:
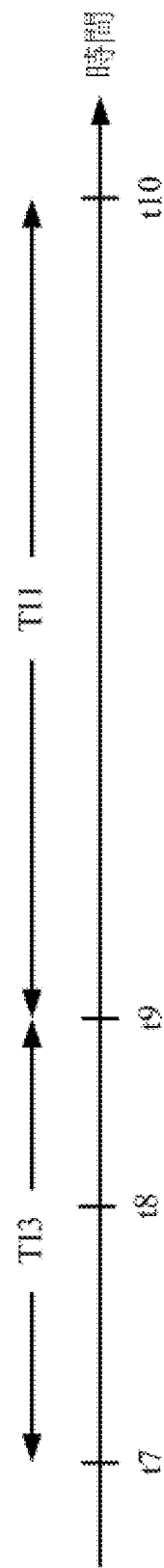

The eleventh embodiment of the present invention is as shown in FIGS. 12A-12C. The eleventh embodiment is an extension of the third embodiment. Different from the previous embodiments in which the UE 1 switches from the active downlink BWP DLBWP3 to the initial downlink BWP DLBWP1 after receiving the switch indication information 204, the UE 1 in this embodiment should further determine that each of at least one timer is expired after receiving the switch indication information 204 so as to switch from the active downlink BWP DLBWP3 to the initial downlink BWP DLBWP1. The time interval of each timer can be preconfigured by the BS 2 through the RRC message. The time interval of each timer may also be configured by the BS 2 dynamically through the MAC CE or UE-specific DCI during the data transmission between the UE 1 and the BS 2.

For example, please refer to FIG. 12A, the UE 1 starts the time TI1 after receiving the switch indication information 204 transmitted by the BS 2 at the time point t1, and the UE 1 switches from the active downlink BWP DLBWP3 to the initial downlink BWP DLBWP1 at the time point t2 that the timer TI1 is expired. The timer TI1 may be a BWP switch timer. If the UE 1 receives the switch indication information 204 while operating in a discontinuous reception (DRX) mode and the DRX inactivity timer is still running, then the UE 1 stops the DRX inactivity timer and starts the timer TI1 no matter whether the UE 1 is receiving the downlink data or not.

As another example referring to FIG. 12B, it is assumed that the UE 1 starts the timer TI2 (e.g., the DRX inactivity timer or on Duration timer) at the time point t3 and receives the switch indication information 204 at the time point t4 within the time interval that the timer TI2 is still running (i.e., the time point t3 to the time point t5), then the UE 1 will start the timer TI1 directly without stopping the timer TI2. Thus, the UE 1 will switch from the active downlink BWP DLBWP3 to the initial BWP DLBWP1 when both the timer TI1 and the timer TI2 are expired.

As another example referring to FIG. 12C, the UE 1 starts the timer TI3 (e.g., the DRX retransmission timer) in response to failing to receive the downlink data at the time point t7. In this case, if the UE 1 receives the switch indication information 204 at the time point t8 within the time interval that the timer TI3 is stilling running (i.e., the time point t7 to the time point t9), the UE 1 will start the timer TI1 when the timer TI3 is expired and switch from the active downlink BWP DLBWP3 to the initial BWP DLBWP1 at the time point t5 that the timer TI1 is expired.

It shall be noted that, in the previous embodiments, if the downlink BWPs configured to the UE includes the initial downlink BWP and the default downlink BWP, the default downlink BWP may be different from the initial downlink BWP. However, in other embodiments, the default downlink BWP configured to the UE 1 may be the same as the initial downlink BWP, and the switch indication information 204 is used for instructing the UE 1 to switch back to the initial downlink BWP. All the operations in the case that the default downlink BWP configured to the UE is the same as the initial downlink BWP shall be appreciated by those of ordinary skill in the art based on the description in the previous embodiments and thus will be not further described herein.

Moreover, in the previous embodiments, the switch indication information 204 is only a simple switch information which instructs the UE 1 to switch to the default downlink BWP or initial downlink BWP. In other words, the UE 1 may switch to the default downlink BWP or the initial downlink BWP in response to different types of the switch indication information 204. The UE 1 switches to the default downlink BWP in the case that the switch indication information 204 is transmitted to the UE 1 through the UE-specific DCI and the default downlink BWP is configured to the UE 1. Otherwise, in the other cases, the UE 1 will switch back to the initial downlink BWP. As a result, the BS 2 clearly figures out which UEs are staying on the default downlink BWP and transmits the SI on the default downlink BWPs belonging to those UEs, respectively. However, in other embodiment, the switch indication information 204 may be complex switch information, the switch indication information 204 instructs the UE 1 to switch to one of the default downlink BWP and the initial downlink BWP in the case that the BS 2 uses the UE-specific DCI. For example, the switch indication information 204 may represent the default downlink BWP and the initial downlink BWP by more than one bit, or using different specific synchronization signals to represent the default downlink BWP and the initial downlink BWP, respectively.

Besides, the previous embodiments are illustrated in the situation that the BWPs do not overlap with each other. However, in other embodiment, two adjacent BWPs of the uplink BWPs or the downlink BWPs may have a partial overlapped radio resource. When each downlink BWP has a CORSET, the position of the CORSET may be on the partial overlapped radio resource of the two adjacent BWPs. Therefore, when each of the two adjacent downlink BWPs has a common search spaces, the common search space may be shared to the two adjacent downlink BWPs. Moreover, when the adjacent uplink BWPs have a partial overlapped radio resource, the PRACH may be shared to the adjacent uplink BWPs, i.e., the BS 2 can configure the same radio resource as the PRACH for the adjacent uplink BWPs.

Figure 13A:
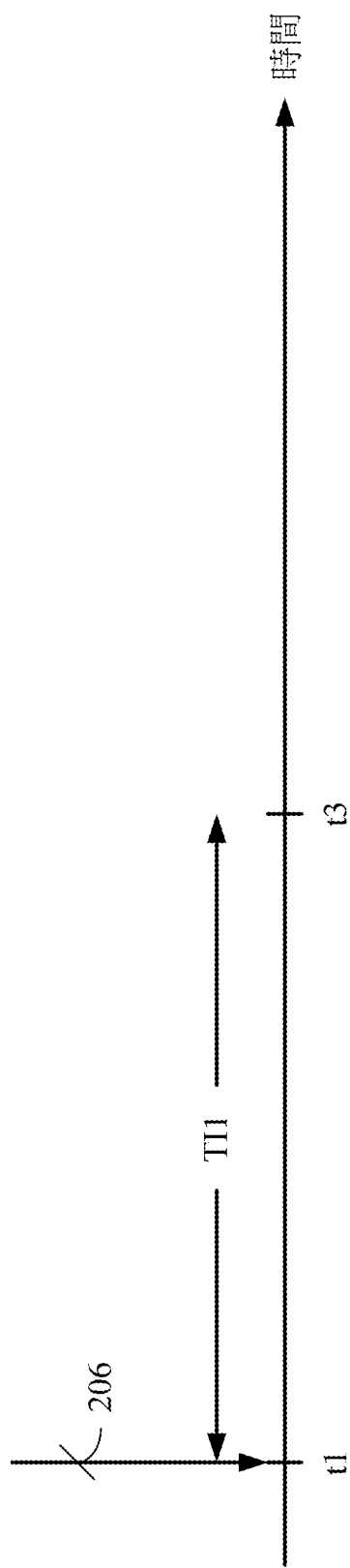
FIGS. 13A-13B depict an implementation scenario in which the UE 1 switches from the active downlink BWP to the default downlink BWP after the timer is expired.
Figure 13B:
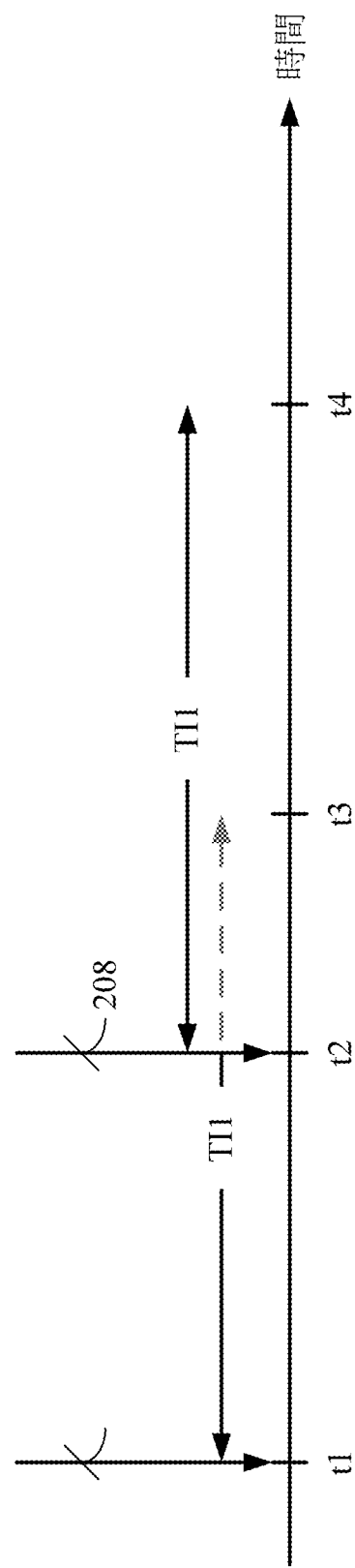

The twelfth embodiment of the present invention is as shown in FIGS. 13A-13B. In the previous embodiments, the BS 2 transmits the switch indication information 204 through the message-based method to instruct the UE 1 to switch to the initial downlink BWP DLBWP1 or the default downlink BWP DLBWP2 to receive the common DCI. However, in this embodiment, when the default downlink BWP DLBWP2 has been configured to the UE 1, the UE 2 determines the timing of switching to the default downlink BWP DLBWP2 based on whether there still have downlink data needed to be received and whether the timer is expired or not.

For example, please refer to FIG. 13A, the UE 1 starts the timer TI1 when receiving the DCI 206 from the BS 2 on the active downlink BWP DLBWP3 at the time point t1. The DCI 206 indicates the reception of downlink data. Similarly, the timer TI1 may be a BWP switch timer, and the time interval of the timer TI1 is longer than the time interval during which the UE 1 is receiving the downlink data. Afterwards, the UE 1 switches from the active downlink BWP DLBWP3 to the default downlink BWP DLBWP2 at the time point t3 that the timer TI1 is expired.

Furthermore, as shown in FIG. 13B, the UE 1 would restart the timer TI1 if the UE 1 further receives another DCI 208 on the active downlink BWP DLBWP3 from the BS 2 at the time point t2 earlier than the time point t3 (i.e., before the timer TI1 is expired). Afterwards, the UE 1 switches from the active downlink BWP DLBWP3 to the default downlink BWP DLBWP2 at the time point t4 that the timer TI1 is expired.

According to the above mentioned, in this embodiment, if the UE 1 receives the downlink data in response to the DCI before the timer TI1 is expired, the UE 1 will restart the timer TI1 for receiving the downlink data until no additional DCI indicating further downlink data to be received before the timer TI1 is expired, and then the UE 1 will switch from the active downlink BWP DLBWP3 to the default downlink BWP DLBWP2 when the timer TI1 is expired. In other words, in the example as shown in FIG. 13B, the UE 1 restarts the timer TI1 again if the UE 1 receives new DCI additionally at the time point t4 (i.e., before the timer TI1 is expired).

Similarly, in other embodiment, if the default downlink BWP DLBWP2 is not configured to the UE1, the UE 1 will switch from the active downlink BWP DLBWP3 to the initial downlink BWP DLBWP1 when the timer TI1 is expired.

Figure 14:
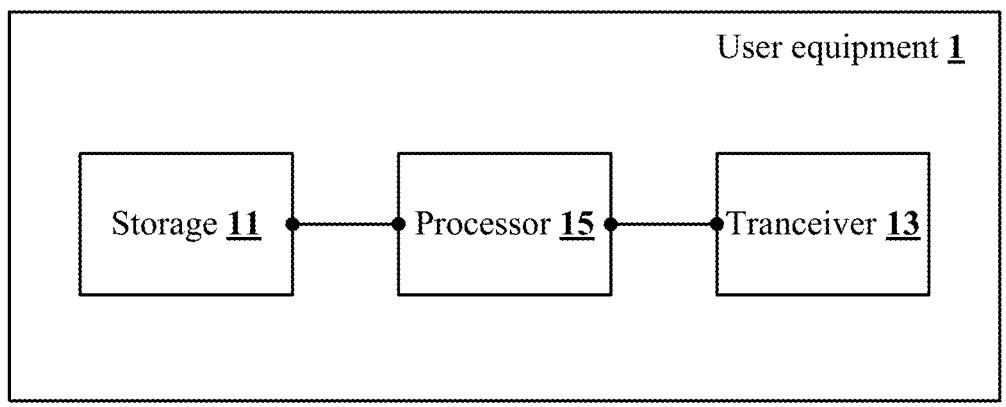
FIG. 14 is a schematic view of the UE 1 according to the present invention.

A thirteenth embodiment of the present invention is as shown in FIG. 14, which is a schematic view of the UE 1 according to the present invention. The UE 1 comprises a storage 11, a transceiver 13 and a processor 15. The processor 15 is electrically connected to the storage 11 and the transceiver 13.

The processor 15 transmits, via the transceiver 13, a preamble to a BS (e.g., the BS 2) on a PRACH of an active uplink BWP (e.g., the uplink BWP DLBWP3) of a plurality of uplink BWPs (e.g., the uplink BWPs of the uplink area ULR), and receives, via the transceiver 13, a random access response message from the BS on an active downlink BWP (e.g., the downlink BWP DLBWP3) of a plurality of downlink BWPs (e.g., the downlink BWPs of the downlink area DLR) according to a linkage. The linkage defines that the active downlink BWP corresponds to the active uplink BWP, as described in the first embodiment.

In an embodiment, each of the uplink BWPs has an uplink BWP identifier and each of the downlink BWPs has a downlink BWP identifier. The linkage defines that the uplink BWP identifiers correspond to the downlink BWP identifiers, one-on-one. In addition, in other embodiment, the linkage defines that at least one of the uplink BWP identifiers corresponds to one of the downlink BWP identifiers.

In an embodiment, the processor 15 further switches from a previous active downlink BWP of the BWPs to the active downlink BWP according to the linkage, e.g., the UE switches from the downlink BWP DLBWP4 to the downlink BWP DLBWP3 in the first embodiment, as shown in FIGS. 4A-4B.

In an embodiment, the processor 15 further receives switch indication information (e.g., the switch indication information 200) from the BS via the transceiver 13, switches from an initial downlink BWP to the active downlink BWP according to the switch indication information, and transmits the preamble to the BS on the PRACH of the active uplink BWP corresponding to the active downlink BWP according to the linkage, as described in the second embodiment.

In an embodiment, the processor 15 further receives switch indication information (e.g., the switch indication information 204) from the BS via the transceiver 13 and switches from the active downlink BWP to an initial downlink BWP according to the switch indication information, as described in the third embodiment. In an embodiment, the processor 15 further receives switch indication information (e.g., the switch indication information 204) from the BS via the transceiver 13 and switches from the active downlink BWP to a default downlink BWP according to the switch indication information, as described in the fourth embodiment.

In an embodiment, the processor 15 further receives, via the transceiver 13, the switch indication information on a physical broadcast channel (PBCH) of a synchronization signal block, as described in the fifth embodiment. Besides, in an embodiment, the processor 15 further receives, via the transceiver 13, a specific synchronization signal representing the switch indication information on the synchronization signal block, as described in the fifth embodiment.

In an embodiment, the processor 15 further receives group-common downlink control information (DCI) on the active downlink BWP via the transceiver 13, and the group-common DCI includes the switch indication information, as described in the sixth embodiment. In an embodiment, the group-common DCI further indicates a radio resource on a physical downlink share channel (PDSCH) of the default downlink BWP to make the UE retrieve system information (SI) from the radio resource, as shown in FIGS. 10B and 10D.

In an embodiment, the processor 15 further receives UE-specific DCI including the switch indication information on the active downlink BWP via the transceiver 13, as described in the seventh embodiment. In an embodiment, the UE-specific DCI further indicates a radio resource on a PDSCH of the default downlink BWP to make the UE retrieve system information from the radio resource, as shown in FIGS. 10B and 10D.

In an embodiment, the processor 15 further receives a MAC CE including the switch indication information on a PDSCH of the active downlink BWP via the transceiver 13, as described in the ninth and tenth embodiments. Besides, in an embodiment, the processor 15 further receives a paging message including the switch indication information on a PDSCH of the active downlink BWP via the transceiver 13, as described in the ninth and tenth embodiments.

In an embodiment, the processor 15 determines that each of at least one timer is expired after receiving the switch indication information so as to switch from the active downlink BWP to the initial downlink BWP, as described in the eleventh embodiment.

In an embodiment, the processor 15 further receives UE-specific DCI on the active downlink BWP via the transceiver 13 and starts a timer, as described in the twelfth embodiment. If the processor 15 further receives another UE-specific DCI on the active downlink BWP via the transceiver 13 before the timer is expired, the processor 15 restarts the timer, and the processor 15 switches from the active downlink BWP to the default downlink BWP when the timer is expired.

In an embodiment, two adjacent BWPs of the uplink BWPs or the downlink BWPs have a partial overlapped radio resource.

Figure 15:
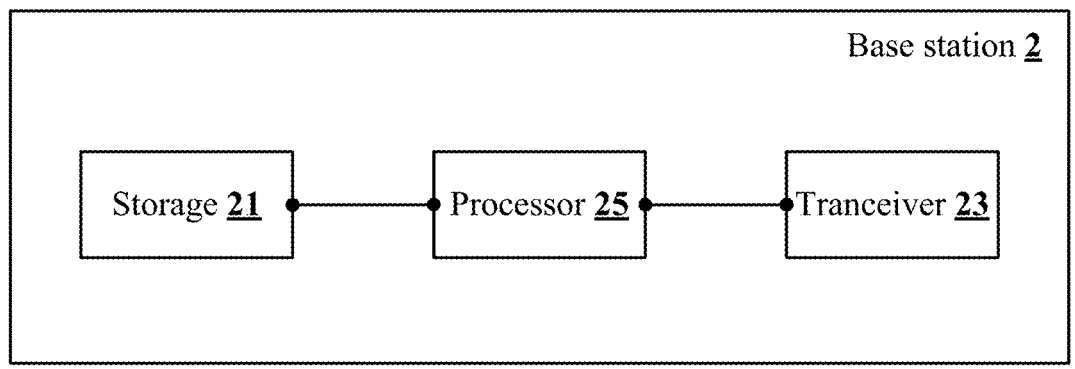
FIG. 15 is a schematic view of the BS 2 according to the present invention.

A fourteenth embodiment of the present invention is as shown in FIG. 15, which is a schematic view of the base station 2 according to the present invention. The base station 2 comprises a storage 21, a transceiver 23 and a processor 25. The processor 25 is electrically connected to the storage 21 and the transceiver 23.

The processor 25 receives, via the transceiver 23, a preamble on a physical random access channel (PRACH) of one of a plurality of uplink BWPs (e.g., the uplink BWP ULBWP3) and transmits, via the transceiver 23, a random access response message on one of a plurality of downlink BWPs according to a linkage. The linkage defines that the one of the downlink BWPs corresponds to the one of uplink BWPs.

In an embodiment, each of the uplink BWPs has an uplink BWP identifier and each of the downlink BWPs has a downlink BWP identifier, the linkage defines that the uplink BWP identifiers correspond to the downlink BWP identifiers, one-on-one. Besides, in an embodiment, the linkage defines that at least one of the uplink BWP identifiers corresponds to one of the downlink BWP identifiers.

In an embodiment, the processor 25 further transmits switch indication information (e.g., the switch indication information 204) via the transceiver 23 to make a UE switch from the active downlink BWP to an initial downlink BWP according to the switch indication information, as described in the third embodiment. In an embodiment, the processor 25 further transmits switch indication information (e.g., the switch indication information 204) via the transceiver 23 to make a UE switch from the active downlink BWP to a default downlink BWP according to the switch indication information, as described in the fourth embodiment.

In an embodiment, the processor 25 further transmits, via the transceiver 23, the switch indication information on a physical broadcast channel (PBCH) of a synchronization signal block, as described in the fifth embodiment. Besides, in an embodiment, the processor 25 further transmits, via the transceiver 23, a specific synchronization signal representing the switch indication information on the synchronization signal block, as described in the fifth embodiment.

In an embodiment, the processor 25 further transmits group-common downlink control information (DCI) on the active downlink BWP of the UE via the transceiver 23, and the group-common DCI includes the switch indication information, as described in the sixth embodiment. In an embodiment, the group-common DCI further indicates a radio resource on a physical downlink share channel (PDSCH) of the default downlink BWP to make the UE retrieve system information (SI) from the radio resource.

In an embodiment, the processor 25 further transmits UE-specific DCI including the switch indication information on the active downlink BWP of the UE via the transceiver 23, as described in the seventh embodiment. In an embodiment, the UE-specific DCI further indicates a radio resource on a PDSCH of the default downlink BWP to make the UE retrieve SI from the radio resource.

In an embodiment, the processor 25 further transmits a medium access control (MAC) control element (CE) including the switch indication information on a PDSCH of the active downlink BWP of the UE via the transceiver 23, as described in the ninth and tenth embodiments. Besides, in an embodiment, the processor 25 further transmits a paging message including the switch indication information on a PDSCH of the active downlink BWP of the UE via the transceiver 23, as described in the ninth and tenth embodiments.

In an embodiment, two adjacent BWPs of the uplink BWPs or the downlink BWPs have a partial overlapped radio resource.

According to the above descriptions, the BWP configuration mechanism of the present invention enables the UE to transmit a preamble on its active uplink BWP and to receive a random access response message transmitted by the BS on an active downlink BWP corresponding to the active uplink BWP based on a linkage. Accordingly, the present invention can reduce the possibilities that the UEs switch back to the initial uplink BWP and the initial downlink BWP so as to decrease the preamble transmission collision on the initial uplink BWP. Therefore, the present invention can balance the resource utilization among the BWPs and further reduce the UE's transmission latency.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE) for a mobile communication system, comprising:
   a storage;
   a transceiver; and a processor electrically connected to the storage and the transceiver, being configured to execute the following operations:

receiving switch indication information from a base station (BS) via the transceiver;

switching from an initial downlink BWP to an active downlink bandwidth part (BWP) of a plurality of downlink BWPs according to the switch indication information;

transmitting, via the transceiver, a preamble to the BS on a physical random access channel (PRACH) of an active uplink BWP of a plurality of uplink BWPs corresponding to the active downlink BWP according to a linkage, the linkage defining that the active downlink BWP corresponds to the active uplink BWP; and receiving, via the transceiver, a random access response message from the BS on the active downlink BWP according to the linkage.

2. The UE of claim 1, wherein each of the uplink BWPs has an uplink BWP identifier, each of the downlink BWPs has a downlink BWP identifier, the linkage defines that the uplink BWP identifiers correspond to the downlink BWP identifiers, one-on-one.

3. The UE of claim 1, wherein each of the uplink BWPs has an uplink BWP identifier, each of the downlink BWPs has a downlink BWP identifier, the linkage defines that at least one of the uplink BWP identifiers corresponds to one of the downlink BWP identifiers.

4. The UE of claim 1, wherein the processor further receives another switch indication information from the BS via the transceiver and switches from the active downlink BWP to a default downlink BWP or the initial downlink BWP according to the another switch indication information.

5. The UE of claim 4, wherein the processor further receives group-common downlink control information (DCI) on the active downlink BWP via the transceiver, and the group-common DCI includes the another switch indication information.

6. The UE of claim 5, wherein the group-common DCI further indicates a radio resource on a physical downlink share channel (PDSCH) of the default downlink BWP to make the UE retrieve system information from the radio resource.

7. The UE of claim 4, wherein the processor further receives UE-specific DCI on the active downlink BWP via the transceiver, and the UE-specific DCI includes the another switch indication information.

8. The UE of claim 5, wherein the UE-specific DCI further indicates a radio resource on a PDSCH of the default downlink BWP to make the UE retrieve system information from the radio resource.

9. The UE of claim 4, wherein the processor further receives a medium access control (MAC) control element (CE) on a PDSCH of the active downlink BWP via the transceiver, and the MAC CE includes the another switch indication information.

10. The UE of claim 4, wherein the processor further receives a paging message on a physical downlink share channel of the active downlink BWP via the transceiver, and the paging message includes the another switch indication information.

11. The UE of claim 4, wherein the processor determines that each of at least one timer is expired after receiving the another switch indication information so as to switch from the active downlink BWP to the initial downlink BWP.

12. The UE of claim 1, wherein the processor further receives UE-specific DCI on the active downlink BWP via the transceiver and starts a timer, wherein if the processor further receives another UE-specific DCI on the active downlink BWP via the transceiver before the timer is expired, the processor restarts the timer, and the processor switches from the active downlink BWP to a default downlink BWP when the timer is expired.

13. The UE of claim 1, wherein two adjacent BWPs of the uplink BWPs or the downlink BWPs have a partial overlapped radio resource.

14. A base station (BS) for a mobile communication system, comprising:

a storage;

a transceiver; and a processor electrically connected to the storage and the transceiver, being configured to execute the following operations:

transmitting switch indication information via the transceiver to make a user equipment (UE) switch from an initial downlink BWP to an active downlink bandwidth part (BWP) of a plurality of downlink BWPs according to the switch indication information;

receiving, via the transceiver, a preamble on a physical random access channel (PRACH) of a corresponding uplink BWP of a plurality of uplink BWPs according to a linkage, wherein the linkage defines that a corresponding downlink BWP of the downlink BWPs corresponds to the corresponding uplink BWP, and the downlink BWP for the BS is the active downlink BWP for the UE; and transmitting, via the transceiver, a random access response message on the corresponding downlink BWP according to the linkage.

15. The BS of claim 14, wherein each of the uplink BWPs has an uplink BWP identifier, each of the downlink BWPs has a downlink BWP identifier, the linkage defines that the uplink BWP identifiers correspond to the downlink BWP identifiers, one-on-one.

16. The BS of claim 14, wherein each of the uplink BWPs has an uplink BWP identifier, each of the downlink BWPs has a downlink BWP identifier, the linkage defines that at least one of the uplink BWP identifiers corresponds to one of the downlink BWP identifiers.

17. The BS of claim 14, wherein the processor further transmits another switch indication information via the transceiver to make the UE switch from the active downlink BWP to a default downlink BWP or the initial downlink BWP according to the another switch indication information.

18. The BS of claim 14, wherein two adjacent BWPs of the uplink BWPs or the downlink BWPs have a partial overlapped radio resource.

\* \* \* \* \*